US010655036B2

(12) United States Patent
Uemura et al.

(10) Patent No.: US 10,655,036 B2
(45) Date of Patent: *May 19, 2020

(54) ADHESIVE SHEET AND ADHESIVE SHEET PRODUCTION METHOD

(71) Applicant: LINTEC CORPORATION, Itabashi-ku (JP)

(72) Inventors: Kazue Uemura, Tsukubamirai (JP); Yusuke Matsuoka, Tatsuno (JP); Takamasa Kase, Koshigaya (JP); Kiichiro Kato, Saitama (JP)

(73) Assignee: LINTEC CORPORATION, Itabashi-ku (JP)

( * ) Notice: Subject to any disclaimer, the term of this patent is extended or adjusted under 35 U.S.C. 154(b) by 70 days.

This patent is subject to a terminal disclaimer.

(21) Appl. No.: 15/762,909

(22) PCT Filed: Sep. 27, 2016

(86) PCT No.: PCT/JP2016/078536

§ 371 (c)(1),
(2) Date: Mar. 23, 2018

(87) PCT Pub. No.: WO2017/057411

PCT Pub. Date: Apr. 6, 2017

(65) Prior Publication Data

US 2019/0085215 A1 Mar. 21, 2019

(30) Foreign Application Priority Data

Sep. 28, 2015 (JP) .................. 2015-190523

(51) Int. Cl.
*C09J 7/38* (2018.01)
*B32B 3/30* (2006.01)
(Continued)

(52) U.S. Cl.
CPC ............... *C09J 7/385* (2018.01); *B32B 3/30* (2013.01); *B32B 7/06* (2013.01); *B32B 7/12* (2013.01);
(Continued)

(58) Field of Classification Search
CPC ... C09J 133/08; C09J 7/02; C09J 7/385; C09J 7/255; C09J 7/203; C09J 7/22; C09J 7/38;
(Continued)

(56) References Cited

U.S. PATENT DOCUMENTS

| 6,294,250 B1 * | 9/2001 | Date ........................ C09J 7/50 428/353 |
| 9,240,131 B2 * | 1/2016 | Onderisin .............. B31D 1/027 |
| 2010/0196669 A1 | 8/2010 | Hatakenaka |

FOREIGN PATENT DOCUMENTS

| JP | 2001-507732 A | 6/2001 |
| JP | 2005-193484 A | 7/2005 |

(Continued)

OTHER PUBLICATIONS

International Search Report dated Jan. 10, 2017 in PCT/JP2016/078536 filed Sep. 27, 2016.

*Primary Examiner* — Patricia L. Nordmeyer
(74) *Attorney, Agent, or Firm* — Oblon, McClelland, Maier & Neustadt, L.L.P.

(57) ABSTRACT

Provided is a pressure sensitive adhesive sheet including a resin layer on a substrate or a release material, at least a surface (α) of the resin layer on the side opposite to the side thereof on which the substrate or the release material is provided having pressure sensitive adhesiveness, wherein a concave portion and plural flat faces having an irregular shape exist in a region (Dc) surrounded by an arbitrarily predetermined circle on the surface (α) of the resin layer; and with respect to one or more flat faces (S) among the (Continued)

plural flat faces, the one or more flat faces (S) excluding flat faces having a cumulative relative frequency of 30% or less determined by adding the relative frequency from the respective flat faces with a smaller area, an $r_{MAX}$ value of the flat faces (S) calculated from specified operations is 0.60 or less.

15 Claims, 10 Drawing Sheets

(51) Int. Cl.
| | |
|---|---|
| B32B 27/00 | (2006.01) |
| B32B 7/06 | (2019.01) |
| C08K 3/36 | (2006.01) |
| C08K 3/22 | (2006.01) |
| B32B 7/12 | (2006.01) |
| B32B 27/20 | (2006.01) |
| B32B 27/36 | (2006.01) |
| C09J 11/04 | (2006.01) |

(52) U.S. Cl.
CPC ............ *B32B 27/00* (2013.01); *B32B 27/20* (2013.01); *B32B 27/36* (2013.01); *C09J 11/04* (2013.01); *B32B 2255/10* (2013.01); *B32B 2255/26* (2013.01); *B32B 2264/102* (2013.01); *C08K 3/22* (2013.01); *C08K 3/36* (2013.01); *C09J 2201/36* (2013.01); *C09J 2201/622* (2013.01); *C09J 2205/102* (2013.01); *C09J 2433/00* (2013.01)

(58) Field of Classification Search
CPC . C09J 7/10; C09J 7/0207; C09J 7/0217; C09J 7/0253; C09J 7/026; C09J 7/0285; C09J 7/20; C09J 5/00; C09J 11/04; C09J 201/00; C09J 2201/16; C09J 2201/28; C09J 2201/36; C09J 2201/606; C09J 2205/10; C09J 2205/102; C09J 2205/114; C09J 2400/163; C09J 2421/00; C09J 2433/00; C09J 2467/006; C09J 2475/00; C09J 2483/005; B05D 1/36; B05D 3/108; B05D 5/00; C08K 3/346; C08K 3/36; C08K 3/34; C08K 3/013; C08K 7/00; C08K 2201/003
See application file for complete search history.

(56) References Cited

FOREIGN PATENT DOCUMENTS

| | | |
|---|---|---|
| JP | 2006-342285 A | 12/2006 |
| JP | 2015-196805 A | 11/2015 |
| WO | 2009/011396 A1 | 1/2009 |
| WO | 2015/152352 A1 | 10/2015 |

* cited by examiner (a)

(b)

(a)

(b)

(a)

(b)

ADHESIVE SHEET AND ADHESIVE SHEET PRODUCTION METHOD

TECHNICAL FIELD

The present invention relates to a pressure sensitive adhesive sheet and a method for producing a pressure sensitive adhesive sheet.

BACKGROUND ART

A general pressure sensitive adhesive sheet is constituted of a substrate, a pressure sensitive adhesive layer formed on the substrate, and a release material provided on the pressure sensitive adhesive layer depending on necessity, and in use, after removing the release material in the case where the release material is provided, the general pressure sensitive adhesive sheet is attached to an adherend by bringing the pressure sensitive adhesive layer into contact therewith.

A pressure sensitive adhesive sheet having a large attaching area, which may be used for identification or decoration, masking for painting, surface protection of a metal plate or the like, and the like, has a problem that in attaching the sheet to an adherend, air accumulation is liable to occur between the pressure sensitive adhesive layer and the adherend, and the portion with the air accumulation is recognized as "blister", so as to prevent the pressure sensitive adhesive sheet from being attached cleanly to the adherend.

For solving the problem, for example, PTL 1 describes a pressure sensitive adhesive sheet having grooves with a specified shape that are disposed artificially in a prescribed pattern on the surface of the pressure sensitive adhesive layer by making a release material having a fine emboss pattern into contact with the surface of the pressure sensitive adhesive layer.

There is described that, by using the pressure sensitive adhesive sheet, it is possible to escape the "air accumulation" formed on attaching to an adherend, to the exterior through the grooves formed artificially on the surface of the pressure sensitive adhesive layer.

CITATION LIST

Patent Literature

PTL 1: JP 2001-507732 A

SUMMARY OF INVENTION

Technical Problem

However, the pressure sensitive adhesive sheet having a pressure sensitive adhesive layer having grooves with a specified shape disposed in a general predetermined pattern, as described in PTL 1, etc., has a problem that when the width of the grooves is small, it is difficult to vent the air, and when the width of the grooves is large, not only the surface of the substrate is dented to deteriorate the appearance, but also the pressure sensitive adhesive strength is lowered.

In the pressure sensitive adhesive sheet, the grooves disposed in a prescribed pattern deteriorate the pressure sensitive adhesive strength locally in the site having the grooves disposed, and in attaching the pressure sensitive adhesive sheet to an adherend, there is a possibility that the sheet is detached therefrom in the foregoing site.

On the other hand, in the case where the pressure sensitive adhesive sheet is attached to an adherend and then peeled again therefrom, there is a possibility of adhesive deposits remaining on the adherend depending on the peeling direction of the pressure sensitive adhesive sheet because the pressure sensitive adhesion characteristics of the pressure sensitive adhesive sheet vary locally. For example, in the case where the pressure sensitive adhesive sheet having the pressure sensitive adhesive layer wherein the grooves of a lattice pattern are disposed is peeled obliquely, there is a possibility of adhesive deposits remaining on the adherend.

Furthermore, in the case where the pressure sensitive adhesive sheet is punched out, there is a concern that the disposition pattern of the grooves overlaps the punching pattern. In this case, the cutting depth may fluctuate to cause a problem that a cut line cannot be suitably formed in the pressure sensitive adhesive sheet.

In addition to the above, the pressure sensitive adhesive sheet described in PTL 1, etc. has the aforementioned structure regarding the shapes and forming positions of the grooves in the pressure sensitive adhesive layer, and therefore, in contemplating to attach the pressure sensitive adhesive sheet to the adherend, there may give rise to harmful effects, such as the matter that it is difficult to efficiently escape the air accumulation to the exterior depending upon the direction to which a pressure is applied, etc. Namely, in the pressure sensitive adhesive sheet, in contemplating to attach the pressure sensitive adhesive sheet to the adherend, a balance between air escape property and pressure sensitive adhesion characteristics, etc. is liable to be lowered depending upon the direction to which a pressure is applied.

An object of the present invention is to provide a pressure sensitive adhesive sheet in which in attaching the pressure sensitive adhesive sheet to an adherend, even in the case where a pressure is applied to any direction, excellent air escape property and pressure sensitive adhesion characteristics can be revealed with a well balance and a method for producing the pressure sensitive adhesive sheet.

Solution to Problem

In order to solve the aforementioned problem, the present inventors contemplated a pressure sensitive adhesive sheet having a resin layer in which a concave portion and plural flat faces having an irregular shape exist in an arbitrarily selected predetermined region of a surface with pressure sensitive adhesiveness.

Then, it has been found that a pressure sensitive adhesive sheet, in which when one or more flat faces (S) among the plural flat faces, the one or more flat faces (S) excluding flat faces having a cumulative relative frequency of 30% or less determined by adding the relative frequency from those with a smaller area, is rotated from 0 to 90° for every 15° to measure an average value of a ratio of [{area of flat face (S)}/{area of circumscribed rectangle of flat face (S)}], a maximum value of the average value is 0.60 or less, is able to solve the aforementioned problem, thereby leading to accomplishment of the present invention.

Specifically, the present invention provides the following [1] to [18]. [1] A pressure sensitive adhesive sheet including a resin layer on a substrate or a release material, at least a surface ($\alpha$) of the resin layer on the side opposite to the side thereof on which the substrate or the release material is provided having pressure sensitive adhesiveness, wherein a concave portion and plural flat faces having an irregular shape exist in a region (Dc) surrounded by a circle having a diameter of 8 mm that is arbitrarily selected on the surface ($\alpha$) of the resin layer; and with respect to one or more flat faces (S) among the plural flat faces, the one or more flat faces (S) excluding flat faces having a cumulative relative frequency of 30% or less determined by adding the relative frequency from the respective flat faces with a smaller area, in placing the region (Dc) containing the one or more flat faces (S) on an orthogonal coordinate system in which a direction orthogonal to the horizontal Feret's diameter direction is the vertical Feret's diameter direction, an $r_{MAX}$ value of the one or more flat faces (S) calculated from the following operations (i) to (iii) is 0.60 or less:

Operation (i): With respect to all of the one or more flat faces (S) contained in the region (Dc), a ratio of an area of the flat face (S) to an area of a circumscribed rectangle of flat face (S), which circumscribes the flat face (S) by two pairs of straight lines parallel to the horizontal Feret's axis and the vertical Feret's axis [{area of flat face (S)}/{area of circumscribed rectangle of flat face (S)}] is calculated for every flat face (S), and r(0°) that is an average value of the obtained ratios is calculated;

Operation (ii): With respect to each of all of the one or more flat faces (S) in each region obtained by rotating the region (Dc) at θ (θ=15°, 30°, 45°, 60°, 75°, or) 90° in the counterclockwise direction centering on, as a center of the rotation, the center of the circle of the region (Dc) used in the operation (i) in the orthogonal coordinate system, a ratio of an area of the flat face (S) to an area of a circumscribed rectangle of flat face (S), which circumscribes the flat face (S) by two pairs of straight lines parallel to the horizontal Feret's axis and the vertical Feret's axis [{area of flat face (S)}/{area of circumscribed rectangle of flat face (S)}] is calculated for every flat face (S), and r(θ) that is an average value of the obtained ratios is calculated with respect to every case at θ=15°, 30°, 45°, 60°, 75°, and 90°; and Operation (iii): A maximum value of the seven values of r(θ) (θ=0°, 15°, 30°, 45°, 60°, 75°, and 90°) as calculated in the operations (i) and (ii) is defined as the $r_{MAX}$ value of the flat faces (S).

[2] The pressure sensitive adhesive sheet as set forth in the above [1], wherein in the region (Dc) surrounded by a circle having a diameter of 8 mm that is arbitrarily selected on the surface (α) of the resin layer, one or more flat faces (f1) having an area where a range surrounded by a circle having a diameter of at least 100 μm is selectable exist.

[3] The pressure sensitive adhesive sheet as set forth in the above [1] or [2], wherein in the region (Dc) surrounded by a circle having a diameter of 8 mm that is arbitrarily selected on the surface (α) of the resin layer, one or more flat faces (f2) having an area of 0.2 mm² or more exist.

[4] The pressure sensitive adhesive sheet as set forth in any one of the above [1] to [3], wherein a skewness Sk value relative to a normal distribution curve between the area and the frequency of each of the one or more flat faces (S) is 1.0 or more.

[5] The pressure sensitive adhesive sheet as set forth in the above [4], wherein a kurtosis Ku value relative to a normal distribution curve between the area and the frequency of each of the one or more flat faces (S) is 1.8 or more.

[6] The pressure sensitive adhesive sheet as set forth in any one of the above [1] to [5], wherein the concave portion has a maximum height difference of 0.5 μm or more.

[7] The pressure sensitive adhesive sheet as set forth in any one of the above [1] to [6], wherein the concave portion is not one formed using a release material having an emboss pattern.

[8] The pressure sensitive adhesive sheet as set forth in any one of the above [1] to [7], wherein the resin layer contains a resin part (X) containing a resin as a main component, and a particle part (Y) consisting of fine particles.

[9] The pressure sensitive adhesive sheet as set forth in the above [8], wherein a mass retention rate after heating the resin layer at 800° C. for 30 minutes is 3 to 90% by mass.

[10] The pressure sensitive adhesive sheet as set forth in the above [8] or [9], wherein the resin contained in the resin part (X) contains a pressure sensitive adhesive resin.

[11] The pressure sensitive adhesive sheet as set forth in any one of the above [8] to [10], wherein the resin part (X) further contains at least one selected from a metal chelate crosslinking agent and an epoxy crosslinking agent.

[12] The pressure sensitive adhesive sheet as set forth in any one of the above [8] to [11] wherein the fine particles are one or more selected from silica particles, metal oxide particles, and smectite.

[13] The pressure sensitive adhesive sheet as set forth in any one of the above [1] to [12], wherein the surface (β) of the resin layer on the side on which the substrate or the release material is provided has pressure sensitive adhesiveness.

[14] The pressure sensitive adhesive sheet as set forth in any one of the above [1] to [13], wherein the resin layer has a multilayer structure in which a layer (Xβ) mainly containing the resin part (X), a layer (Y1) containing the particle part (Y) in an amount of 15% by mass or more, and a layer (Xα) mainly containing the resin part (X) are laminated in this order from the side on which the substrate or the release material is provided.

[15] The pressure sensitive adhesive sheet as set forth in the above [14], wherein
the layer (Xβ) is a layer formed by a composition (xβ) containing a resin and having a content of fine particles of less than 15% by mass,
the layer (Y1) is formed by a composition (y) containing fine particles in an amount of 15% by mass or more, and
the layer (Xα) is a layer formed by a composition (xα) containing a resin and having a content of fine particles of less than 15% by mass.

[16] A method for producing the pressure sensitive adhesive sheet as set forth in any one of the above [1] to [13], which includes at least the following steps (1) and (2);
step (1); a step of forming a coating film (x') formed by a composition (x) containing the resin and having a content of the fine particles of less than 15% by mass, and a coating film (y') formed by a composition (y) having the fine particles in an amount of 15% by mass or more; and
step (2); a step of drying the coating film (x') and the coating film (y') formed in the step (1) simultaneously.

[17] A method for producing the pressure sensitive adhesive sheet as set forth in the above [15], which includes at least the following steps (1A) and (2A);
step (1A); a step of forming, on the substrate or the release material, a coating film (xβ') formed by the composition (xβ) containing the resin and having a content of the fine particles of less than 15% by mass, a coating film (y') formed by the composition (y) containing the fine particles in an amount of 15% by mass or more, and a coating film (xα') formed by the composition (xα) containing the resin and having a content of the fine particles of less than 15% by mas, by laminating in this order; and
step (2A); a step of drying the coating film (xβ'), the coating film (y'), and the coating film (xα') formed in the step (1A) simultaneously.

[18] A method for producing the pressure sensitive adhesive sheet as set forth in the above [15], which includes at least the following steps (1B) and (2B);

step (1B); a step of forming, on a layer (Xβ) mainly containing the resin part (X) that is provided on the substrate or the release material, a coating film (y') formed by the composition (y) containing the fine particles in an amount of 15% by mass or more, and a coating film (xα') formed by a composition (xα) containing the resin and having a content of the fine particles of less than 15% by mass, by laminating in this order; and step (2B); a step of drying the coating film (y') and the coating film (xαα) formed in the step (1B) simultaneously.

Advantageous Effects of Invention

In accordance with the pressure sensitive adhesive sheet of the present invention, in contemplating to attach the pressure sensitive adhesive sheet to an adherend, even in the case where a pressure is applied to any direction, excellent air escape property and pressure sensitive adhesion characteristics may be revealed with a well balance.

DESCRIPTION OF EMBODIMENTS

Figure 1:
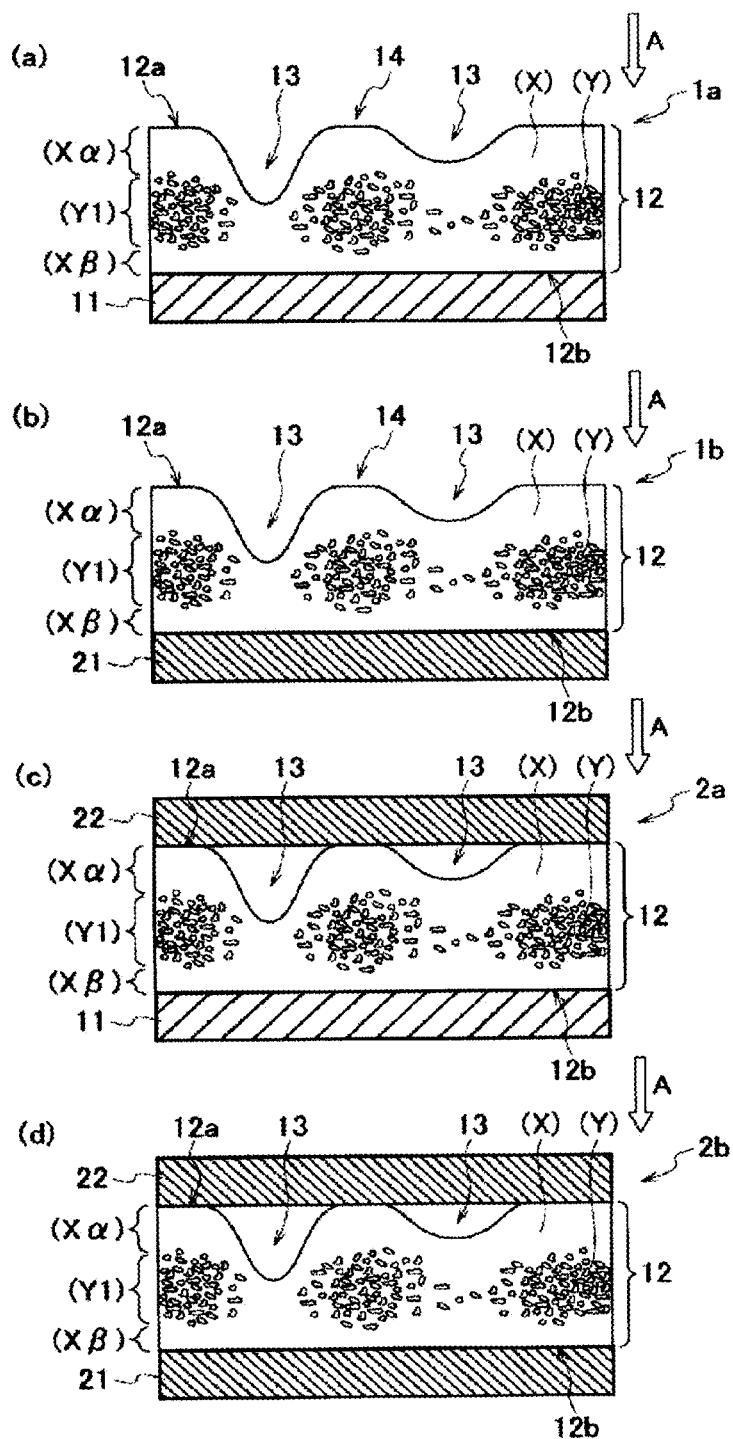
FIG. 1 is a schematic cross sectional view showing an example of the structure of the pressure sensitive adhesive sheet of the present invention.

In the present invention, for example, an expression "YY containing a component XX as a main component" or an expression "YY mainly containing a component XX" means that "among the components contained in YY, a component having a largest content is the component XX". A specific content of the component XX in this expression is typically 50% by mass or more, and is preferably 65 to 100% by mass, more preferably 75 to 100% by mass, and still more preferably 85 to 100% by mass relative to the total amount (100% by mass) of YY.

In the present invention, for example, "(meth)acrylic acid" indicates both "acrylic acid" and "methacrylic acid", and the same is also applicable to other analogous terms.

Regarding a preferred numerical range (for example, a range of content or the like), a lower limit and an upper limit that are expressed in stages can be combined each independently. For example, from an expression of "preferably 10 to 90, and more preferably 30 to 60", "the preferred lower limit (10)" and "the more preferred upper limit (60)" may be combined to be "10 to 60".

In the present invention, in principle, the judgement on whether or not the respective requirements regarding the concave portion and the flat face existing in the region (Dc) surrounded by a circle having a diameter of 8 mm that is arbitrarily selected on the surface ($\alpha$) of the resin layer are satisfied, and the calculation of the various measured values regarding the concave portion, the flat face, and the flat face (S) are performed based on images acquired for the region (Dc) from the side of the surface ($\alpha$) of the resin layer with a digital microscope (magnification: 30 to 100 times).

Figure 5:
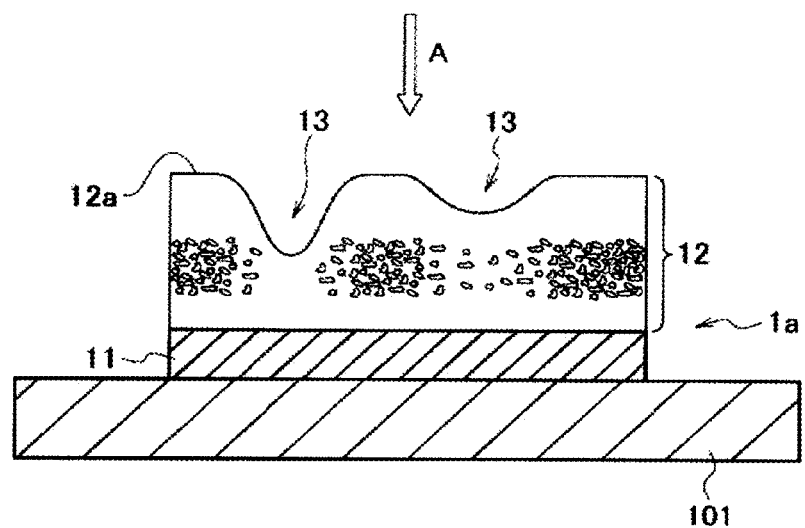
FIG. 5 is a schematic cross sectional view of a measurement sample used for observation of the surface (α) of the resin layer of the pressure sensitive adhesive sheet as produced in each of Examples and Comparative Examples.
Figure 5:
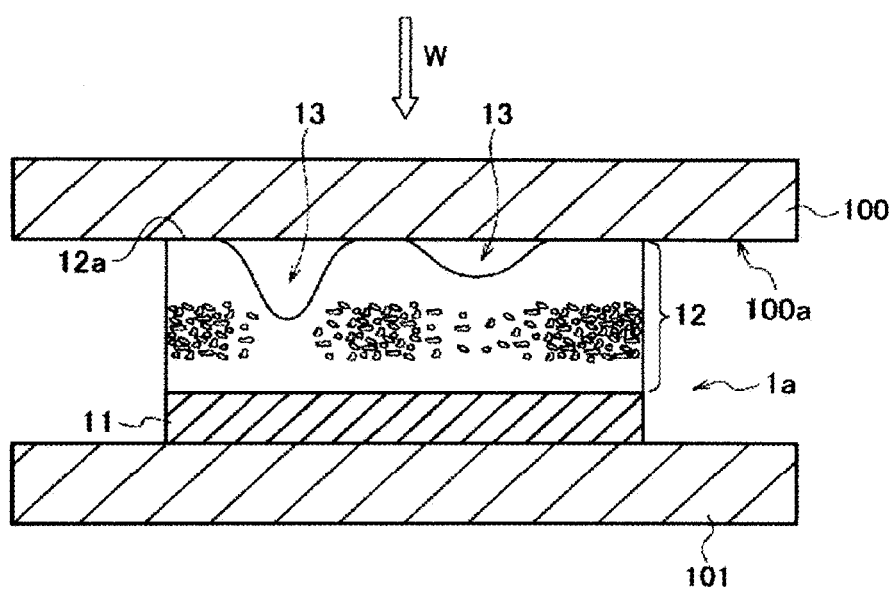

In the observation with a digital microscope, as shown in FIG. 5, it is suitable that a focus is gradually moved from an upper portion of a site on a surface ($\alpha$) 12a where a flat face is considered to exist through visual inspection toward the A direction, and any portion which is first in focus is observed as the flat face.

In the case where focus is not fixed, as shown in FIG. 5(*b*), the judgement may be performed by a method in which a translucent adherend 100 having a smooth surface 100a is attached on the surface ($\alpha$) 12a of the resin layer by using a squeegee without applying a load as far as possible, and the surface ($\alpha$) 12a of the resin layer is observed through the translucent adherend 100 from the W direction by using a digital microscope, thereby confirming whether or not the concave portion and the flat face exist. Namely, a site of the surface ($\alpha$) coming into contact with the smooth surface 100a can be judged as the "flat face", and a site of the surface ($\alpha$) not coming into contact with the smooth surface 100a can be judged as the "concave portion".

The judgement on whether or not the respective requirements are satisfied and the calculation of the various measured values may be performed by subjecting the foregoing image to image processing, such as binarization processing, etc., by using an image processing (analysis) software, as the need arises.

In acquiring an image of the region (Dc), the image of the region (Dc) may be acquired by photographing the entire surface of the region (Dc) as selected in a low magnification all at once by using a digital microscope.

Meanwhile, the image may also be acquired by observing the selected region (Dc) in a high magnification by using a digital microscope. However, when the observation is performed in a high magnification, there may be a case where the foregoing region (Dc) becomes larger than a photographable region with the digital microscope. In such a case, using an image connecting function of the digital microscope, arbitrarily selected regions adjoining each other are photographed to acquire neighboring plural images to make a connected image thereof, and a portion surrounded by a circle having a diameter of 8 mm that is arbitrarily selected from the connected image may be used as an image of the region (Dc).

Examples of the digital microscope which is used in the description of the present specification include "Digital Microscope VHX-1000" and "Digital Microscope VHX-5000", all of which are a product name, manufactured by Keyence Corporation, and the like.

[Configuration of Pressure Sensitive Adhesive Sheet of the Present Invention]

The pressure sensitive adhesive sheet of the present invention is a pressure sensitive adhesive sheet including a resin layer on a substrate or a release material, at least a surface ($\alpha$) of the resin layer on the side opposite to the side thereof on which the substrate or the release material is provided having pressure sensitive adhesiveness, wherein a concave portion and plural flat faces having an irregular shape exist in a region (Dc) surrounded by a circle having a diameter of 8 mm that is arbitrarily selected on the surface ($\alpha$) of the resin layer.

FIG. 1 is a schematic cross sectional view showing an example of the structure of the pressure sensitive adhesive sheet of the present invention.

Examples of the pressure sensitive adhesive sheet of an embodiment of the present invention include a pressure sensitive adhesive sheet 1a having a resin layer 12 on a substrate 11 as shown in FIG. 1(*a*); and a pressure sensitive adhesive sheet 1b having a resin layer 12 on a release material 21 as shown in FIG. 1(*b*).

In the pressure sensitive adhesive sheet of the present invention, at least a surface ($\alpha$) 12a of the resin layer 12 on the side opposite to the side on which the substrate 11 or the release material 21 is provided (hereinafter also referred to simply as "surface ($\alpha$)") has pressure sensitive adhesiveness, and a concave portion 13 and a flat face 14 exist.

Accordingly, from the viewpoint of handleability, the pressure sensitive adhesive sheet of another embodiment of the present invention preferably has a configuration of a pressure sensitive adhesive sheet 2a or 2b as shown in FIG. 1(*c*) or FIG. 1(*d*), wherein a release material 22 is further provided on the surface ($\alpha$) 12a of the resin layer 12 in the pressure sensitive adhesive sheet 1a or 1b as shown in FIG. 1.

In the pressure sensitive adhesive sheet of one embodiment of the present invention, as shown in FIG. 1, the resin layer 12 is preferably a layer containing a resin part (X) containing a resin and a particle part (Y) consisting of fine particles.

When the particle part (Y) is contained in the resin layer 12, the shape retentivity after attachment can be improved, and the resulting pressure sensitive adhesive sheet can be provided with improved blister resistance when used at a high temperature.

The details of the resin part (X) and the particle part (Y) are described later.

In the pressure sensitive adhesive sheet that is one embodiment of the present invention, a surface ($\beta$) 12b of the resin layer 12 on the side on which the substrate 11 or the release material 21 is provided (hereinafter also referred to simply as "surface ($\beta$)") may have pressure sensitive adhesiveness.

When the surface ($\beta$) has also pressure sensitive adhesiveness, in the pressure sensitive adhesive sheet 1a or 2a shown in FIG. 1(*a*) or FIG. 1(*c*), the adhesion between the resin layer 12 and the substrate 11 becomes good, and in the pressure sensitive adhesive sheet 1b or 2b shown in FIG. 1(*b*) or FIG. 1(*d*), a double-sided pressure sensitive adhesive sheet can be provided.

[Concave Portion and Flat Face Existing in the Region (Dc)]

Figure 2:
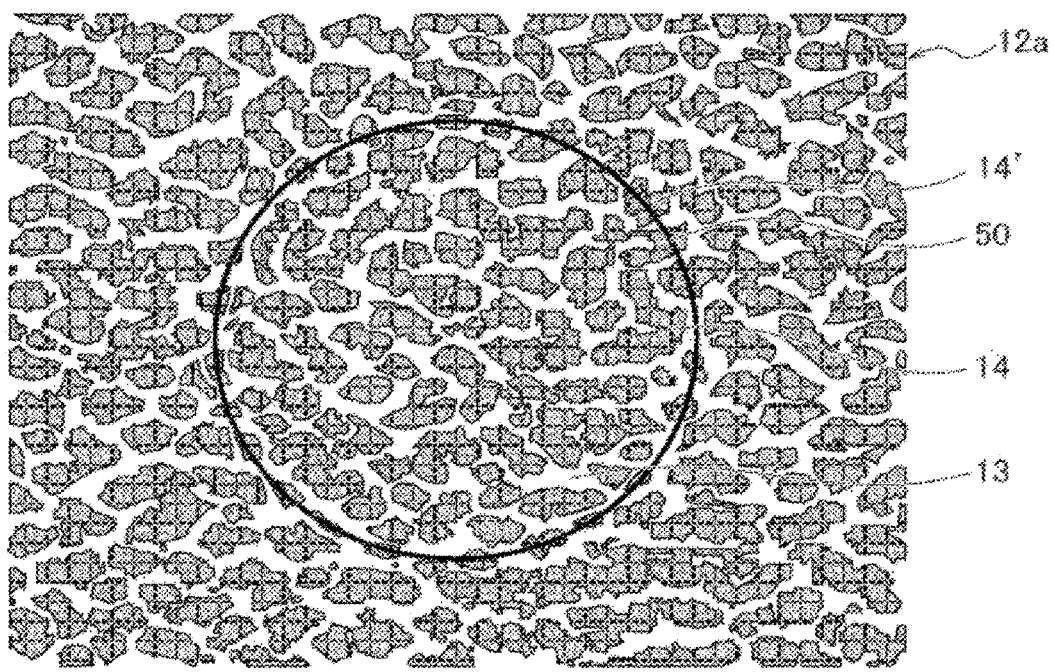
FIG. 2 is a schematic plan view of a surface (α) in observing from the side of the surface (α) of a resin layer which the pressure sensitive adhesive sheet of the present invention has.

FIG. 2 is a schematic plan view of the surface ($\alpha$) in observing from the side of the surface ($\alpha$) of the resin layer which the pressure sensitive adhesive sheet of the present invention has.

As shown in FIG. 2, in the region (Dc) surrounded by a circle 50 having a diameter of 8 mm that is arbitrarily selected on the surface (α) 12a of the resin layer which the pressure sensitive adhesive sheet of the present invention has, the concave portion 13 and the plural flat faces 14 having an irregular shape exist.

The concave portion 13 existing on the surface (α) also plays a role of air-discharge channel for removing outside the "air accumulation" to be formed in attaching the surface (α) of the resin layer of the pressure sensitive adhesive sheet of the present invention to an adherend.

Meanwhile, the flat face 14 existing on the surface (α) of the resin layer is a face coming into direct contact with the adherend and adhering closely thereof in attaching to the adherend and is a site influencing the pressure sensitive adhesive strength of the pressure sensitive adhesive sheet.

In a pressure sensitive adhesive sheet having a pressure sensitive adhesive sheet provided with grooves, which is formed of a release sheet having a generally designed emboss pattern, a site which is good in the air escape property but weak in the pressure sensitive adhesive strength and a site which is conversely excellent in the pressure sensitive adhesion characteristics but inferior in the air escape property exist.

In such a pressure sensitive adhesive sheet having a pressure sensitive adhesive sheet provided with groves formed in such a manner that the shape, width, and length as well as the number, the existing position, and the like are artificially set in advance, it is difficult to improve all of characteristics, such as air escape property, appearance, pressure sensitive adhesion characteristics, punching property, etc., with a well balance, and unevenness is generated depending upon the shape, the number, etc. of the grooves of the pressure sensitive adhesive layer.

On the other hand, in the pressure sensitive adhesive sheet of the present invention, the plural flat faces 14 having an irregular shape exist on the surface (α) of the resin layer which is an attachment surface to the adherend, and therefore, different from a surface of a pressure sensitive adhesive layer formed using a release sheet having a general emboss pattern, the presence of sites where the pressure sensitive adhesive strength is locally weak, or sites where the air escape property is inferior can be extremely minimized. As a result, uniformly excellent air escape property and pressure sensitive adhesion characteristics can be revealed on the surface (α) of the resin layer.

In the pressure sensitive adhesive sheet of one embodiment of the present invention, from the viewpoint of providing a pressure sensitive adhesive sheet having improved various characteristics, such as air escape property, pressure sensitive adhesion characteristics, etc., with a well balance, the concave portions 13 existing in the region (Dc) are also preferably an irregular concave portion.

In the pressure sensitive adhesive sheet of one embodiment of the present invention, it is more preferred that plural irregular concave portions exist in the region (Dc).

When plural irregular concave portions exist in the region (Dc), even in the case where a pressure is applied from a fixed direction, and the shape of a part of the concave portions existing on the surface (α) collapses, the concave portions 13 in which the shape is maintained are easy to exist on the surface (α), and vanishing of an air escape channel can be prevented.

In the present invention, the term "irregular shape" does not mean a regular shape, such as a figure capable of drawing a center of a circle, an oval, or the like, a polygon, etc., but refers to a shape in which no regularity is present in the form, and no similarity is found in individual shapes. Specifically, the shapes of the concave portions 13 and the flat faces 14 as shown in FIG. 2 are corresponding thereto.

On the other hand, examples of the "regular shape" but not the "irregular shape" include a circle, an oval, a polygon, and the like. In addition, in the present specification, the "polygon" refers to a figure capable of drawing diagonal lines in the inside thereof (without being protruded outside) and being surrounded by straight lines in which the sum of interior angles is 180×n (degrees) (n is a natural number). The polygon also includes one in which an edge part thereof has a round-shaped curvature.

The length of the concave portion 13 in a planar view of the concave portion 13 existing on the surface (α) is not particularly limited. Namely, the concave portion 13 includes a relatively long groove-like one and a relatively short pit-like one.

In the region (Dc) surrounded by the circle 50 having a diameter of 8 mm that is arbitrarily selected on the surface (α) 12a, a regular flat face may exist together with the plural irregular flat faces 14.

However, from the viewpoint of extremely minimizing the presence of sites where the pressure sensitive adhesive strength is locally weak, or sites where the air escape property is inferior on the surface (α) with pressure sensitive adhesiveness of the resin layer, it is preferred that an occupying area ratio of the irregular flat face relative to the whole area of the flat faces existing in the region (Dc) is as large as possible.

In one embodiment of the present invention, from the aforementioned viewpoint, the occupying area ratio of the irregular flat face existing in the region (Dc) relative to 100% of the whole area of the flat faces existing in the region (Dc) is preferably 80 to 100%, more preferably 90 to 100%, still more preferably 95 to 100%, and yet still more preferably 100%.

In one embodiment of the present invention, the occupying area ratio of the flat faces existing in the region (Dc) relative to 100% of the whole area of the region (Dc) is preferably 20 to 90%, more preferably 30 to 80%, still more preferably 40 to 70%, and yet still more preferably 45 to 65%.

In the region (Dc) surrounded by the circle 50 having a diameter of 8 mm that is arbitrarily selected on the surface (α) 12a, a regular concave portion may exist together with the irregular concave portion 13.

However, from the viewpoint of providing a pressure sensitive adhesive sheet having improved various characteristics, such as air escape property, pressure sensitive adhesion characteristics, etc., with a well balance, it is preferred that an occupying area ratio of the irregular concave portion relative to the whole area of the concave portions existing in the region (Dc) is as large as possible.

In one embodiment of the present invention, the occupying area ratio of the irregular concave portion existing in the region (Dc) relative to 100% of the whole area of the concave portions existing in the region (Dc) is preferably 80 to 100%, more preferably 90 to 100%, still more preferably 95 to 100%, and yet still more preferably 100%.

In one embodiment of the present invention, the occupying area ratio of the concave portions existing in the region (Dc) relative to 100% of the whole area of the region (Dc) is preferably 10 to 80%, more preferably 20 to 70%, still more preferably 30 to 60%, and yet still more preferably 35 to 55%.

The aforementioned "occupying area ratio of the flat face or concave portion" can be calculated by subjecting an image of the region (Dc) on the surface (α) acquired with a digital microscope (magnification: 30 to 100 times) by the aforementioned method to image processing (binarization processing) by using an image processing software.

It is preferred that the shape of the irregular flat face existing on the surface (α) can be viewed through visual inspection from the surface (α) side.

Similarly, it is preferred that the shape of the irregular concave portion existing on the surface (α) can be viewed through visual inspection from the surface (α) side.

As shown in FIG. 1(c) or FIG. 1(d), in the pressure sensitive adhesive sheet 2a or 2b in which the release material 22 is laminated on the surface (α) 12a of the resin layer 12, in removing the release material 22, the exposed surface (α) 12a is to be observed through visual inspection.

In one embodiment of the present invention, from the viewpoint of providing a pressure sensitive adhesive sheet having more improved various characteristics, such as air escape property, pressure sensitive adhesion characteristics, etc., with a well balance, it is preferred that the shapes of the concave portion and the flat face existing on the surface (α) of the resin layer is not one having a shape to be a fixed repeating unit.

In one embodiment of the present invention, from the viewpoint of providing a pressure sensitive adhesive sheet having more improved various characteristics, such as air escape property, pressure sensitive adhesion characteristics, etc., with a well balance, it is preferred that the plural flat faces exist on the surface (α) of the resin layer, and the positions at which the plural flat faces exist do not have any periodicity. In addition, from the same viewpoint, it is preferred that the plural concave portions exist on the surface (α) of the resin layer, and the positions at which the plural concave portions exist do not have any periodicity.

In the present invention, the wording "the positions at which the plural concave portions or flat faces exist do not have any periodicity" means that on the surface (α) of the resin layer, the positions at which the plural concave portions or flat faces exist do not have the same repeating pattern and are in a random state.

[Requirement (I): $r_{MAX}$ Value of Flat Faces (S)]

The pressure sensitive adhesive sheet of the present invention is one satisfying the following requirement (I).

Requirement (I):

With respect to one or more flat faces (S) among the plural flat faces, the one or more flat faces (S) excluding flat faces having a cumulative relative frequency of 30% or less determined by adding the relative frequency from the respective flat faces with a smaller area, in placing the region (Dc) containing the one or more flat faces (S) on an orthogonal coordinate system in which a direction orthogonal to the horizontal Feret's diameter direction is the vertical Feret's diameter direction, an $r_{MAX}$ value of the flat faces (S) calculated from the following operations (i) to (iii) is 0.60 or less:

Operation (i): With respect to all of the one or more flat faces (S) contained in the region (Dc), a ratio of an area of the flat face (S) to an area of a circumscribed rectangle of flat face (S), which circumscribes the flat face (S) by two pairs of straight lines parallel to the horizontal Feret's axis and the vertical Feret's axis [{area of flat face (S)}/{area of circumscribed rectangle of flat face (S)}] is calculated for every flat face (S), and r(0°) that is an average value of the obtained ratios is calculated;

Operation (ii); With respect to each of all of the one or more flat faces (S) in each region obtained by rotating the region (Dc) at θ (θ=15°, 30°, 45°, 60°, 75°, or) 90° in the counterclockwise direction centering on, as a center of the rotation, the center of the circle of the region (Dc) used in the operation (i) in the orthogonal coordinate system, a ratio of an area of the flat face (S) to an area of a circumscribed rectangle of flat face (S), which circumscribes the flat face (S) by two pairs of straight lines parallel to the horizontal Feret's axis and the vertical Feret's axis [{area of flat face (S)}/{area of circumscribed rectangle of flat face (S)}] is calculated for every flat face (S), and r(θ) that is an average value of the obtained ratios is calculated with respect to every case at θ=15°, 30°, 45°, 60°, 75°, and 90°; and Operation (iii): A maximum value of the seven values of r(θ) (θ=0°, 15°, 30°, 45°, 60°, 75°, and 90°) as calculated in the operations (i) and (ii) is defined as the $r_{MAX}$ value of the flat faces (S).

Among the plural flat faces existing in the region (Dc), the "flat faces (S)" prescribed in the aforementioned requirement (I) refers to residual flat faces resulting from excluding flat faces having a cumulative relative frequency of 30% or less determined by adding the relative frequency from the respective flat faces with a smaller area.

In the present invention, the reason why the "flat faces having a cumulative relative frequency of 30% or less determined by adding the relative frequency from the respective flat faces with a smaller area" are excluded from the object of the operations (i) to (iii) is as follows.

Namely, in acquiring the image of the region (Dc) with the digital microscope, the flat face (flat face 14' in FIG. 2) orthogonal to a boundary line of the region (Dc) is occasionally cut by the circle 50 that is the boundary line of the region (Dc). For example, even in FIG. 2, it is noted that a plurality of the flat faces 14' which are cut by the circle 50 that is the boundary line of the region (Dc) exist.

This "flat face 14'" is a flat face which intersects with the circle 50 that is the boundary line of the region (Dc) by chance depending upon selection of the region (Dc), is cut within the region (Dc), and becomes small in the area but not a flat face which is actually existent on the surface (α).

In this way, even when the $r_{MAX}$ value of the flat face is calculated according to the operations (i) to (iii) from data of the area of the flat faces including the flat face 14' cut by the circle 50 that is a boundary line of the region (Dc), if the influence of the data of the flat face 14' which does not actually exist, is cut, and is considered to be small in the area in total becomes large, there is a concern that the data far from the actual state are revealed.

The majority of the "flat face 14' cut by the circle 50 that is a boundary line of the region (Dc)" is included in the "flat faces having a cumulative relative frequency of 30% or less determined by adding the relative frequency from the respective flat faces with a smaller area".

Accordingly, in the present invention, by excluding the "flat faces having a cumulative relative frequency of 30% or less determined by adding the relative frequency from the respective flat faces with a smaller area" from the object of the operations (i) to the influence of the "flat face 14' cut by the circle 50 that is a boundary line of the region (Dc)" is regulated small.

In the aforementioned requirement (I), the region (Dc) containing the one or more flat faces (S) is placed on an orthogonal coordinate system in which a direction orthogonal to the horizontal Feret's diameter direction is the vertical Feret's diameter direction, and the $r_{MAX}$ value of the flat face (S) calculated from the following operations (i) to (iii) is calculated.

Figure 3:
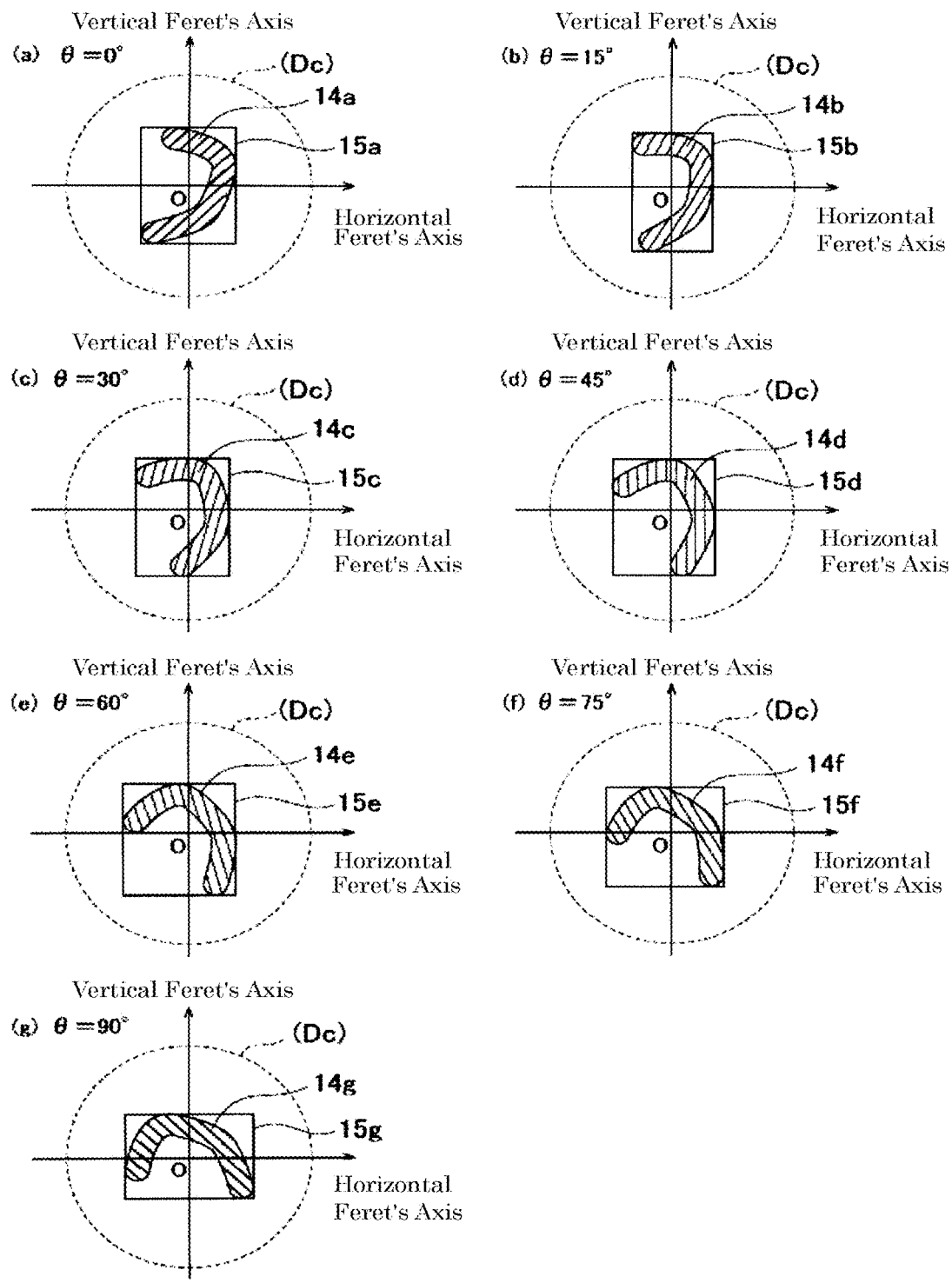
FIG. 3 is a plan view of a flat face (S) in focusing on one of the plural flat faces (S) existing in a region (Dc) for the purpose of explaining the calculation method of r(θ) that is an average value of [{area of flat face (S)}/{area of circumscribed rectangle of flat face (S)}] as calculated in the operations (i) and (ii).

FIG. 3 is a plan view of the flat face (S) in focusing on one of the plural flat faces (S) existing in the region (Dc) for the purpose of explaining the calculation method of r(θ) that is an average value of [{area of flat face (S)}/{area of circumscribed rectangle of flat face (S)}] as calculated in the operations (i) and (ii).

The operations (i) to (iii) are hereunder described while properly referring to FIG. 3.

(Operation (i))

In the case of focusing on one flat face (S) 14a existing in the region (Dc) as shown in FIG. 3(a), the "circumscribed rectangle 15a" as shown in FIG. 3(a), which is a rectangle circumscribing the flat face (S) by two pairs of straight lines parallel to the horizontal Feret's axis and the vertical Feret's axis, is corresponding to the "circumscribed rectangle of the flat face (S) 14a".

In the operation (i), with respect to all of the flat faces (S) existing within the region (Dc), the "area of the flat face (S)" and the "area of the circumscribed rectangle of the flat face (S)" are brought, respectively, and a ratio of [{area of flat face (S)}/{area of circumscribed rectangle of flat face (S)}] in the respective flat face (S) is calculated.

For example, the foregoing ratio of the flat face (S) 14a as shown in FIG. 3(a) is calculated according to [{area of flat face (S) 14a}/{area of circumscribed rectangle 15a}].

Then, r(0°) that is an average value of the foregoing ratio of the respective flat face (S) existing in the region (Dc) is calculated. Namely, the r(0°) is a value as calculated according to the following expression (1).

$$r(\theta°) = \frac{\Sigma S_A/S_B}{n} \quad (1)$$

In the formula (1), $S_A$ represents an area of one flat face (S) as the object; $S_B$ represents an area of the circumscribed rectangle of one flat face (S) as the object; n represents the number of flat faces (S) existing within the selected region (Dc), and in the operation (i), θ=0°.

In the present invention, the value of r(0°) is an index which in observing the one or more flat faces (S) existing in the region (Dc) from a predetermine direction (θ=0°), expresses an average of an area of the one or more flat faces (S) existing in the region (Dc). It may be said that as the value of r(0°) is smaller, the "degree of an area of the flat face (S) is larger". Furthermore, the wording "degree of an area of the flat face (S) is larger" may also be considered to be the "degree of an area of the concave portion existing in the region (Dc)".

(Operation (ii))

With respect to each of all of the one or more flat faces (S) in each region obtained by rotating the region (Dc) at θ (θ=15°, 30°, 45°, 60°, 75°, or 90°) in the counterclockwise direction centering on, as a center of the rotation, the center of the circle of the region (Dc) used in the operation (i) in the orthogonal coordinate system, a ratio of [{area of flat face (S)}/{area of circumscribed rectangle of flat face (S)}] in the respective flat face (S) is brought in the same manner as in the operation (i). Then, r(θ) that is an average value of the ratios of all of the flat faces (S) is calculated.

In the operation (ii), the region (Dc) containing the flat faces (S) is prescribed to be rotated at θ (θ=15°, 30°, 45°, 60°, 75°, and 90°) in the counterclockwise direction centering on, as the "center of the rotation", the center of the circle of the region (Dc).

The region (Dc) is immovable even after the O-rotation. Accordingly, the flat faces (S) existing within the region (Dc) as the measuring object are the same, and only the position (direction) of the flat faces (S) as the measuring object changes by the O-rotation.

For example, a flat face 14b in FIG. 3(b) shows a state in rotating the flat face 14a in FIG. 3(a) at 15° in the counterclockwise direction centering on, as a center of the rotation, a center O of the circle of the region (Dc).

Similarly, flat faces 14c, 14d, 14e, 14f, and 14g in FIG. 3(c) to FIG. 3(g) show states in rotating the flat face 14a in FIG. 3(a) at 30°, 45°, 60°, 75°, and 90°, respectively in the counterclockwise direction centering on, as a center of the rotation, the center O of the circle of the region (Dc).

Namely, though the flat faces 14a, 14b, 14c, 14d, 14e, 14f, and 14g in FIG. 3(a) to FIG. 3(g) are all identical with respect to the shape and area, the positions (directions) are different from each other due to the O-rotation.

Accordingly, in many cases, circumscribed rectangles 15a, 15b, 15c, 15d, 15e, 15f, and 15g which circumscribe these flat faces, respectively are different from each other.

In the operation (ii), with respect to each of all of the one or more flat faces (S) obtained by rotating at θ (θ=15°, 30°, 45°, 60°, 75°, or 90°) as mentioned above, a ratio of an area of the flat face (S) to an area of a circumscribed rectangle of flat face (S), which circumscribes the flat face (S) by two pairs of straight lines parallel to the horizontal Feret's axis and the vertical Feret's axis [{area of flat face (S)}/{area of circumscribed rectangle of flat face (S)}] is calculated for every flat face (S) in the same manner as in the operation (i).

Then, r(θ) (a value calculated according to the aforementioned expression (1)) that is an average value of the foregoing ratio in each flat face (S) existing in the region (Dc) is calculated at every rotation angle θ (θ=15°, 30°, 45°, 60°, 75°, and 90°).

Namely, six values of r(15°), r(30°), r(45°), r(60°), r(75°), and r(90°) are calculated by the operation (ii).

(Operation (iii), Technical Meanings of $r_{MAX}$ Value of Flat Faces (S))

In the operation a maximum value of the seven values of r(θ) (θ=0°, 15°, 30°, 45°, 60°, 75°, and 90°) as calculated in the operations (i) and (ii) is defined as the $r_{MAX}$ value of the flat faces (S).

The values of r(θ) as calculated in the operations (i) and (ii) express a degree of an area of the flat faces (S) in observing all of the one or more flat faces (S) existing in the region (Dc) at the respective predetermined angles θ.

A pressure sensitive adhesive sheet in which in observing from a specified angle θ, the value of r(θ) is a larger value than other angles may also be considered depending upon the shapes or forming positions of the concave portion and flat face existing on the surface (α). It may be said that in such a pressure sensitive adhesive sheet exhibiting a large value of r(θ) at a specified angle θ, the degrees of area of the flat faces (S) and the concave portion are small at this specified angle θ. Accordingly, in contemplating to attach such a pressure sensitive adhesive sheet to an adherend along the direction at a specified angle θ while applying a pressure, there may give rise to harmful effects, such as the matter that it is difficult to efficiently escape the air accumulation to the exterior, etc.

Namely, in a pressure sensitive adhesive sheet in which the value of r(θ) becomes large, in contemplating to attach the pressure sensitive adhesive sheet to an adherend, there is generated a case where the air escape property or the pressure sensitive adhesion characteristics are inferior depending upon the direction to which a pressure is applied.

On the other hand, in the pressure sensitive adhesive sheet of the present invention, a maximum value of the seven values of r(θ) (θ=0°, 15°, 30°, 45°, 60°, 75°, and 90°) is defined as the "$r_{MAX}$ value of the flat faces (S)" by the operation (iii) and is prescribed to be 0.60 or less.

Namely, the "$r_{MAX}$ value of the flat faces (S)" as calculated by the operation (iii) is one which prescribes the degrees of area of the flat faces (S) and the concave portion in a direction where the air escape property is the weakest in the region (Dc).

Accordingly, it may be said that as the "$r_{MAX}$ value of the flat faces (S)" is smaller, the degrees of area of the flat faces (S) and the concave portion existing in the surface (α) in any direction are larger; and in contemplating to attach the pressure sensitive adhesive sheet to an adherend, even in the case of applying a pressure in any direction, a pressure sensitive adhesive sheet in which excellent air escape property and pressure sensitive adhesion characteristics are revealed with a well balance is provided.

In the present invention, from the aforementioned viewpoints, the $r_{MAX}$ value of the flat faces (S) is preferably 0.57 or less, more preferably 0.54 or less, still more preferably 0.51 or less, and yet still more preferably 0.48 or less, and preferably 0.20 or more, and more preferably 0.30 or more.

[Requirement Regarding Flat Faces (S)]

In the pressure sensitive adhesive sheet of one embodiment of the present invention, from the viewpoint of providing a pressure sensitive adhesive sheet having improved various characteristics, such as air escape property, pressure sensitive adhesion characteristics, etc., with a well balance, the aforementioned one or more flat faces (S) preferably satisfy the following requirement (II) and more preferably satisfy both of the following requirements (II) and (III).

Requirement (II);

A skewness Sk value relative to a normal distribution curve between the area and the frequency of each of the one or more flat faces (S) is 1.0 or more.

Requirement (III);

A kurtosis Ku value relative to a normal distribution curve between the area and the frequency of each of the one or more flat faces (S) is 1.8 or more.

<Requirement (II)>

In the present invention, the "skewness Sk value" as prescribed in the requirement (II) statistically expresses a degree of asymmetry relative to a normal distribution curve between the area and the frequency of the flat faces (S).

When the skewness Sk value is 0, the distribution curve between the area and the frequency of the flat faces (S) has a bilaterally symmetrical shape.

When the skewness Sk value is more than 0 (the skewness Sk value is a positive value), the distribution curve between the area and the frequency of the flat faces (S) has a shape in which the peak is far to the left, and the base of the distribution curve extends to the right.

When the skewness Sk value is less than 0 (the skewness Sk value is a negative value), the distribution curve between the area and the frequency of the flat faces (S) has a shape in which the peak is far to the right, and the base of the distribution curve extends to the left.

It is expressed that as an absolute value of the skewness Sk value is larger, the skew becomes larger.

In the requirement (II), it is prescribed that the distribution curve between the area and the frequency of the flat faces (S) existing on the surface (α) is skewed toward the side where the frequency of the flat faces (S) having an area smaller than an average value of the area of the flat faces (S) is high, and the width of the distribution of the area of the flat faces (S) is wide.

It may be considered that such a distribution is caused due to the existence of the flat faces (S) having a small area in the surroundings of the flat faces (S) having a large area. It may be considered that the pressure sensitive adhesion is improved in the large flat faces, whereas the air escape property may be secured by the concave portions neighboring with small flat faces in the surroundings thereof.

In one embodiment of the present invention, as expressed by the skewness Sk value as prescribed in the requirement (II), according to the distribution in which the flat faces (S) having a small area exist in the surroundings of the flat faces (S) having a large area existing on the surface (α) of the pressure sensitive adhesive layer, an appropriate scattering is generated in the contact between the pressure sensitive adhesive layer and the adherend surface, whereby a pressure sensitive adhesive sheet in which various characteristics, such as air escape property, pressure sensitive adhesion characteristics, appearance, punching property, etc., are improved with a well balance can be provided.

In one embodiment of the present invention, the "skewness Sk value" as prescribed in the requirement (II) is preferably 1.0 or more, more preferably 1.1 or more, still more preferably 1.2 or more, and yet still more preferably 1.3 or more.

On the surface of the pressure sensitive adhesive layer where unevennesses exist, which is formed by using a release material having an emboss pattern of a predetermined shape by a general design, plural convex faces exist. In the plural flat faces (convex faces) formed by using the release material having an emboss pattern, which exist on the surface of the pressure sensitive adhesive layer, the formation of the emboss pattern becomes complicated though it is largely depending upon the design of the emboss pattern. Therefore, in many cases, the flat faces which are constant in size, shape, etc., or have the same shape exist in duplicate, and there is a fixed regularity in the shape.

In the case where the plural flat faces formed by using the release material having an emboss pattern exist on the surface of the pressure sensitive adhesive layer, in many cases, the regularity is existent in the shape of the flat face. Therefore, there is a less opportunity that the skewness Sk value as prescribed in the aforementioned requirement (II) is more than 1.

In the present invention, the skewness Sk value relative to a normal distribution curve between the area and the frequency of each of the one or more flat faces (S) can be calculated on the basis of the following expression (2) by using a graph software (Excel, available from Microsoft Japan Co., Ltd.).

$$Sk = \frac{n}{(n-1)(n-2)} \sum_{i=1}^{n} \frac{(x_i - \mu)^3}{s^3} \qquad (2)$$

In the expression (2), n represents the number of flat faces (S); $x_i$ represents an area of each of flat faces (S) 1, 2, ... n); μ represents an average value of areas of respective flat faces (S); and s represents a sample standard deviation.

<Requirement (III)>

In the present invention, the "kurtosis Ku value" as prescribed in the requirement (III) statistically expresses a degree of difference of a curve of a peak of distribution and a base of distribution curve from a normal distribution curve.

When the kurtosis Ku value is 0, a distribution curve which is substantially completely coincident with the normal distribution curve is provided.

When the kurtosis Ku value is more than 0 (the kurtosis Ku value is a positive value), the distribution curve has a sharp peak as compared with the normal distribution curve, and the distribution curve has a heavy base, namely, a shape in which the base of the distribution curve expands is revealed.

When the kurtosis Ku value is less than 0 (the kurtosis Ku value is a negative value), the distribution curve has a flat peak as compared with the normal distribution curve, and the distribution curve has a light base, namely, a shape in which the area of the base of the distribution curve is small is revealed.

In the requirement (III), it is prescribed that the distribution curve between the area and the frequency of the flat faces (S) existing on the surface (α) has a shaper peak than the normal distribution curve and has a shape in which the base of the distribution curve expands.

What the skewness Sk value of the area of the flat faces (S) is 1.0 or more, and the kurtosis Ku value is 1.8 or more means that the distribution curve between the area and the frequency of the flat faces (S) has a shape far from the normal distribution curve while having a numerical bias toward the smaller side.

That is, the distribution of the flat faces (S) existing on the surface (α) is a distribution in which while thoroughly securing a numerical proportion of the flat faces (S) having a small area, the flat faces (S) having a large area also exist in a proportion of the lowest limit or more. Accordingly, an appropriate scattering is generated in the contact between the pressure sensitive adhesive layer and the adhesive surface, whereby a pressure sensitive adhesive sheet in which various characteristics, such as air escape property, pressure sensitive adhesion characteristics, appearance, punching property, etc., are improved with a well balance can be provided.

In one embodiment of the present invention, though the kurtosis Ku value as prescribed in the requirement (III) is preferably 0.5 or more, more preferably 1.0 or more, still more preferably 1.5 or more, and yet still more preferably 1.8 or more, it is even yet still more preferably 1.9 or more, even still more preferably 2.0 or more, and even still more further preferably 2.1 or more.

In the case where the plural flat faces (convex faces) formed by using the release material having an emboss pattern of a predetermined shape by a general design exist on the surface of a pressure sensitive adhesive layer, in many cases, the regularity is existent in the shape of the flat face. Therefore, there is a less opportunity that the kurtosis Ku value as prescribed in the aforementioned requirement (III) is more than 1.8.

In the present invention, the kurtosis Ku value relative to a normal distribution curve between the area and the frequency of each of the one or more flat faces (S) can be calculated on the basis of the following expression (3) by using a graph software (Excel, available from Microsoft Japan Co., Ltd.).

$$Ku = \frac{n(n+1)}{(n-1)(n-2)(n-3)} \sum_{i=1}^{n} \frac{(x_i - \mu)^4}{s^4} - \frac{3(n-1)^2}{(n-2)(n-3)} \quad (3)$$

In the expression (3), n represents the number of flat faces (S); $x_i$ represents an area of each of flat faces (S) 1, 2, . . . n); μ represents an average value of areas of respective flat faces (S); and s represents a sample standard deviation.

<Requirements Regarding Flat Face and Concave Portion Existing in Region (Dc)>

In one embodiment of the present invention, in the region (Dc) surrounded by a circle having a diameter of 8 mm that is arbitrarily selected on the surface (α) of the aforementioned resin layer, it is preferred that one or more flat faces (f1) having an area where a range surrounded by a circle having a diameter of at least 100 μm (preferably a diameter of 150 μm, and more preferably a diameter of 200 μm) is selectable exist, and it is more preferred that a plurality of the flat faces (f1) exist.

When the flat face(s) (f1) exists in the region (Dc), a pressure sensitive adhesive portion to an adherend on the surface (α) is sufficient, and therefore, the adhesion to the adherend can be improved, and a pressure sensitive adhesive sheet with a higher pressure sensitive adhesive strength can be provided.

In the aforementioned embodiment, it is not necessary that all of the flat faces existing in the region (Dc) is corresponding to the flat face (f1), and the flat faces existing in the region (Dc) may contain the flat face (f1).

In another embodiment of the present invention, in the region (Dc) surrounded by a circle having a diameter of 8 mm that is arbitrarily selected on the surface (α) of the resin layer, it is preferred that one or more flat faces (f2) having an area of 0.2 mm² or more (preferably 0.3 mm² or more, and more preferably 0.4 mm² or more) exist, and it is more preferred that a plurality of the flat faces (f2) exist.

When the flat face(s) (f2) exists in the region (Dc), a pressure sensitive adhesive portion to an adherend on the surface (α) is sufficient, and therefore, the adhesion to the adherend can be improved, and a pressure sensitive adhesive sheet with a higher pressure sensitive adhesive strength can be provided.

In the aforementioned embodiment, it is not necessary that all of the flat faces existing in the region (Dc) is corresponding to the flat face (f2), and the flat faces existing in the region (Dc) may contain the flat face (f2).

In the region (Dc), it is preferred that one or more flat faces (f12) corresponding to both of the aforementioned (f1) and (f2) exist, and it is more preferred that a plurality of the flat faces (f12) exist.

In one embodiment of the present invention, in the region (Dc) surrounded by a circle having a diameter of 8 mm that is arbitrarily selected on the surface (α) of the resin layer, it is preferred that a concave portion having an area of 70 to 99.99% (more preferably 85 to 99.99%) relative to 100% of the total area of the concave portions existing in the region (Dc) exists.

When such a concave portion having continuity exists, a pressure sensitive adhesive sheet whose air escape property is more improved can be provided.

[Shape of Concave Portion]

In one embodiment of the present invention, the concave portion 13 existing on the surface (α) 12a of the resin layer 12 is preferably one having a maximum height difference of 0.5 μm or more.

The "concave portion" as prescribed herein refers to a concave having a maximum height difference of 0.5 μm or more, a site having a height difference of 0.5 μm or more may exist in any one portion of the concave portion, and it is not necessary that the concave portion has a height difference of 0.5 μm or more over the whole region.

Figure 4:
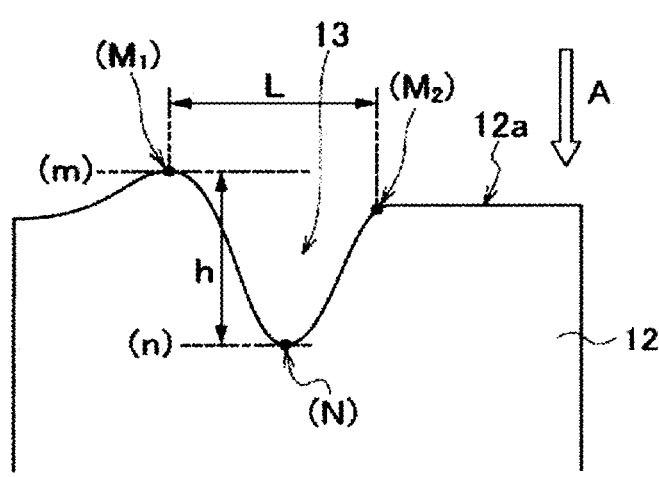
FIG. 4 is a schematic cross sectional view showing an example of the shape of the side of the surface (α) of the resin layer which the pressure sensitive adhesive sheet of the present invention has.
Figure 4:
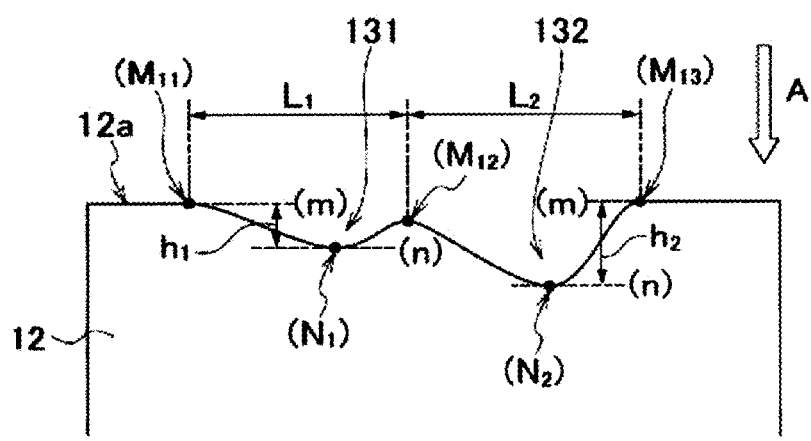

FIG. 4 is a schematic cross sectional view showing an example of the shape of the side of the surface (α) of the resin layer which the pressure sensitive adhesive sheet of the present invention has.

Like the concave portion 13 shown in FIG. 4(a), the shape of an ordinary concave portion has two mountain parts ($M_1$) and ($M_2$) and a valley part (N). The "maximum height difference" of the concave portion in the present invention means the length of the difference (h) between the highest position (m) of the two mountain parts ($M_1$) and ($M_2$) (in FIG. 2(a), the maximum point of the mountain part ($M_1$)) and the lowest position (n) thereof (in FIG. 3(a), the minimum point of the valley part (N)), relative to the thickness direction of the resin layer 12.

It may be considered that the case as in FIG. 4(b) has two concave portions of a concave portion 131 having two mountain parts ($M_{11}$) and ($M_{12}$) and a valley part ($N_1$), and a concave portion 132 having two mountain parts ($M_{12}$) and ($M_{13}$) and a valley part ($N_2$). In this case, the length of the difference ($h_1$) between the maximum point of the mountain part ($M_{11}$) and the minimum point of the valley part ($N_1$) indicates the maximum height difference of the concave portion 131, and the length of the difference ($h_2$) between the maximum point of the mountain part ($M_{13}$) and the minimum point of the valley part ($N_2$) indicates the maximum height difference of the concave portion 132.

From the viewpoint of improving the air escape property of the pressure sensitive adhesive sheet, from the viewpoint of keeping the appearance of the pressure sensitive adhesive sheet good, and from the viewpoint of the shape stability of the pressure sensitive adhesive sheet, a maximum value of the maximum height difference of one concave portion is preferably 1.0 μm or more and not more than the thickness of the resin layer, more preferably 3.0 μm or more and not more than the thickness of the resin layer, and still more preferably 5.0 μm or more and not more than the thickness of the resin layer.

From the viewpoint of improving the air escape property of the pressure sensitive adhesive sheet and from the viewpoint of bettering the pressure sensitive adhesiveness of the pressure sensitive adhesive sheet, an average value of the width of the concave portions is preferably 1 to 500 μm, more preferably 3 to 400 μm, and still more preferably 5 to 300 μm.

In the present invention, the width of the concave portion means the distance between the maximum points of the two mountain parts, and in the concave portion 13 shown in FIG. 4(a), the width indicates the distance L between the mountain part ($M_1$) and the mountain part ($M_2$). In the concave portion 131 shown in FIG. 4(b), the width indicates the distance $L_1$ between the mountain part ($M_{11}$) and the mountain part ($M_{12}$), and in the concave portion 132 therein, the width indicates the distance $L_2$ between the mountain part ($M_{13}$) and the mountain part ($M_{12}$).

In a planar view of the pressure sensitive adhesive sheet of the present invention (when the sheet is viewed from directly above), when the concave portion has a long side and a short side, the short side is the width.

From the viewpoint of improving the air escape property of the pressure sensitive adhesive sheet and from the viewpoint of bettering the adhesiveness of the pressure sensitive adhesive sheet, a ratio of the maximum value of maximum height difference of one concave portion to the average value of the width [(maximum value of maximum height difference)/(average value of width)] (in the concave portion 13 shown in FIG. 4(a), the ratio is "h/L") is preferably 1/500 to 100/1, more preferably 3/400 to 70/3, and still more preferably 1/60 to 10/1.

In the present invention, though the maximum height difference of the concave portion or the width of the concave portion can be measured by observation with a scanning electron microscope (magnification: 100 to 1,000 times), it may be judged from an image acquired using a scanning electron microscope.

In one embodiment of the present invention, from the viewpoint of providing a pressure sensitive adhesive sheet satisfying the aforementioned requirement (I), it is preferred that the aforementioned concave portion is not one formed by using the release material having an emboss pattern.

As the "concave portion formed by using the release material having an emboss pattern", for example, the following concave portions are exemplified and are distinguished from the concave portion of the aforementioned embodiment.

A concave portion formed by pressing a release sheet applied with an emboss pattern onto the flat surface which the pressure sensitive adhesive layer formed of the pressure sensitive adhesive composition has and transferring the emboss pattern.

A concave portion exposed on a surface of the pressure sensitive adhesive layer, when by using a release sheet having an emboss pattern applied on a release-treated face thereof, the pressure sensitive adhesive composition is coated on the release-treated face to form a pressure sensitive adhesive layer, followed by removing the release sheet.

These concave portions occasionally involve a problem in the shape retentivity, so that it may be considered that the air escape property of the pressure sensitive adhesive sheet is affected.

In one embodiment of the present invention, from the viewpoint of providing a pressure sensitive adhesive sheet satisfying the aforementioned requirement (I), it is preferred that the aforementioned concave portion is formed through self-formation of the aforementioned resin layer.

In the present invention, the "self-formation" means a phenomenon of naturally forming a disorganized profile in a process of self-sustaining formation of a resin layer, and more precisely, means a phenomenon of naturally forming a disorganized profile in a process of self-sustaining formation of a resin layer by drying a coating film formed of a composition that is a forming material for a resin layer.

The shape of the concave portion thus formed through self-formation of the resin layer in the manner as above may be controlled in some degree by controlling the drying condition or the kind and the content of the component in the composition that is a forming material for the resin layer, but differ from grooves to be formed through embossed pattern transfer, and it may be said that "it is substantially impossible to reproduce exactly the same shape". Accordingly, it may be said that the concave portion formed through self-formation of the resin layer has an irregular shape.

When the concave portion having an irregular shape is formed, the shape of the flat face also becomes irregular.

The process of formation of the concave portion formed through self-formation of the resin layer may be considered as follows.

First of all, at the time of forming a coating film made of the composition serving as a forming material for the resin layer, in the step of drying the coating film, contraction stress develops inside the coating film, and in the part where the bonding force of the resin has attenuated, the coating film is cracked inside it. With that, it may be considered that the resin around the cracked part flows into the space temporarily formed by cracking, thereby forming the concave portion on the surface (α) of the resin layer.

It may be considered that when two coating films that differ in the resin content are formed, and the two coating films are then dried simultaneously, a contraction stress difference is generated inside the coating films being dried, whereby the coating film is liable to be cracked.

From the viewpoint of readily forming the concave portion, it is preferred to control the condition appropriately in consideration of the following matters. It may be considered that these matters act with each other in a complex form to facilitate the formation of the concave portion. In this connection, suitable embodiments of the respective matters for facilitating the formation of the concave portion are those as described in the corresponding sections as described later.

The kind, constituent monomers, molecular weight and content of the resin contained in the composition of the forming material for the coating film.

The kind of the crosslinking agent and the kind of the solvent contained in the composition of the forming material for the coating film.

The viscosity and the solid concentration of the composition of the forming material for the coating film.

The thickness of the coating film to be formed (when plural layers are formed, the thickness of each coating film).

The drying temperature and the drying time for the formed coating film.

In formation of the pressure sensitive adhesive layer in an ordinary pressure sensitive adhesive sheet, it is intended to form the pressure sensitive adhesive layer having a flat surface, and the aforementioned matters are suitably set in many cases.

On the other hand, in the present invention, the above matters are so set that the concave portion capable of contributing toward improvement of the air escape property of the pressure sensitive adhesive sheet can be formed, quite differing from those in the planning method for the pressure sensitive adhesive layer of ordinary pressure sensitive adhesive sheets.

Preferably, the aforementioned matters are suitably set in consideration of the flowability of the resin and the like contained in the coating film to be formed.

For example, in the case where fine particles are contained in the composition, by controlling the viscosity of the coating film formed of a composition containing a large amount of fine particles to fall within a suitable range, it is possible to suitably prevent the formed coating film from being mixed with any other coating film (a coating film containing a large amount of resin) while the predetermined flowability of the fine particles in the coating film is maintained as such. By such controlling, cracks are formed in the horizontal direction to facilitate formation of the concave portion in the coating film containing a large amount of resin.

As a result, it is possible to increase the proportion of the concave portion to be formed on the surface ($\alpha$) and to increase the proportion of the concave portions connecting to each other, thereby enabling a pressure sensitive adhesive sheet having a more superior air escape property to be provided.

Among the aforementioned matters, it is desirable to suitably control the kind, the constituent monomers, and the molecular weight of the resin and the resin content such that the resin contained in the coating film containing a large amount of the resin has a suitable viscoelasticity.

Namely, by suitably increasing the hardness of the coating film (the hardness to be determined by various factors, such as the viscoelasticity of resin, the viscosity of the coating liquid, etc.), the contract stress of the resin part (X) increases to facilitate the formation of a concave portion. When the hardness of the coating film is higher, the contraction stress becomes high to facilitate the formation of a concave portion, but when the coating film is too hard, the coatability thereof is worsened. In addition, when the resin elasticity is increased too much, the pressure sensitive adhesive strength of the resin layer to be formed from the coating film tends to lower. In consideration of these, it is desirable to suitably control the viscoelasticity of the resin.

In the case where fine particles are contained in the composition or the coating film, it may be considered that by suitably selecting the fine particles and the resin to make the dispersion condition of the fine particles appropriate, the degree of swelling of the thickness of the resin layer owing to the fine particles therein and the self-forming power of the concave portion can be controlled, and as a result, the concave portion is readily formed on the surface ($\alpha$).

Furthermore, in consideration of the crosslinking rate of the formed coating film (or the composition of the forming material), it is desirable that the aforementioned matters are suitably set.

Namely, in the case where the crosslinking rate of the coating film is too high, there is a concern that the coating film is cured before formation of the concave portion. In addition, in that case, the degree of cracking of the coating film and the size of the concave portion are affected.

The crosslinking rate of the coating film may be controlled by suitably defining the kind of the crosslinking agent and the kind of the solvent in the composition that is the forming material or by suitably setting the drying time and the drying temperature for the coating film.

In the case where the resin layer is a layer containing the resin part (X) containing a resin and the particle part (Y) consisting of fine particles, in the resin layer formed through the aforementioned self-formation, as shown in FIGS. 1(*a*) to 1(*d*), in the site where the concave portions 13 exist on the surface ($\alpha$), the particle part (Y) tends to have such a distribution that the occupying ratio of the particle part (Y) becomes small as compared with the other parts.

As for this matter, it may be considered that in the process of self-formation of the resin layer, on the occasion where the concave portion is formed on the surface ($\alpha$) of the resin layer, the fine particles existing at a position where the concave portion is formed move, whereby such a distribution is revealed.

Each configuration of the pressure sensitive adhesive sheet of the present invention is hereunder described.

[Substrate]

The substrate to be used in one embodiment of the present invention is not particularly limited, and examples thereof include a paper substrate, a resin film or sheet, a substrate containing a paper substrate laminated with a resin, and the like, which may be appropriately selected depending upon the purpose of the pressure sensitive adhesive sheet of one embodiment of the present invention.

Examples of paper constituting the paper substrate include thin paper, medium quality paper, wood-free paper, impregnated paper, coated paper, art paper, parchment paper, glassine paper, and the like.

Examples of the resin constituting the resin film or sheet include a polyolefin resin, such as polyethylene, polypropylene, etc.; a vinyl resin, such as polyvinyl chloride, polyvinylidene chloride, polyvinyl alcohol, an ethylene-vinyl acetate copolymer, an ethylene-vinyl alcohol copolymer, etc.; a polyester resin, such as polyethylene terephthalate, polybutylene terephthalate, polyethylene naphthalate, etc.; polystyrene; an acrylonitrile-butadiene-styrene copolymer; cellulose triacetate; polycarbonate; a urethane resin, such as polyurethane, acrylic-modified polyurethane, etc.;

polymethylpentene; polysulfone; polyetheretherketone; polyether sulfone; polyphenylene sulfide; a polyimide resin, such as polyether imide, polyimide, etc.; a polyamide resin; an acrylic resin; a fluorine resin; and the like.

Examples of the substrate containing a paper substrate laminated with a resin include laminated paper containing the aforementioned paper substrate laminated with a thermoplastic resin, such as polyethylene, etc.; and the like.

Among these substrates, a resin film or sheet is preferred, a film or sheet formed of a polyester resin is more preferred, and a film or sheet formed of polyethylene terephthalate (PET) is still more preferred.

In the case where the pressure sensitive adhesive sheet of the present invention is used for an application requiring the heat resistance, a film or sheet constituted of a resin selected from polyethylene naphthalate and a polyimide resin is preferred, and in the case where the pressure sensitive adhesive sheet is used for an application requiring the weather resistance, a film or sheet constituted of a resin selected from polyvinyl chloride, polyvinylidene chloride, an acrylic resin, and a fluorine resin is preferred.

Though the thickness of the substrate may be suitably set according to an application of the pressure sensitive adhesive sheet of the present invention, from the viewpoint of handleability and economy, it is preferably 5 to 1,000 μm, more preferably 10 to 500 μm, still more preferably 12 to 250 μm, and yet still more preferably 15 to 150 μm.

The substrate may further contain various additives, such as an ultraviolet ray absorbent, a light stabilizer, an antioxidant, an antistatic agent, a slipping agent, an antiblocking agent, a colorant, etc.

From the viewpoint of improving the blister resistance of the resulting pressure sensitive adhesive sheet, the substrate to be used in one embodiment of the present invention is preferably a non-air permeable substrate, and specifically, a substrate having a metal layer on the surface of the aforementioned resin film or sheet is preferred.

Examples of the metal which is contained in the metal layer include a metal having metallic gloss, such as aluminum, tin, chromium, titanium, etc.; and the like.

Examples of the method of forming the metal layer include a method of vapor-depositing the aforementioned metal by the PVD method, such as vacuum vapor deposition, sputtering, ion plating, etc.; a method of attaching a metal foil formed of the aforementioned metal with an ordinary pressure sensitive adhesive; and the like. Among those, a method of vapor-depositing the aforementioned metal by the PVD method is preferred.

Furthermore, in the case where a resin film or sheet is used as the substrate, from the viewpoint of improving the adhesion to the resin layer to be laminated on the resin film or sheet, the surface of the resin film or sheet may be subjected to a surface treatment by an oxidizing method, a roughening method, or the like, or may be subjected to a primer treatment.

Examples of the oxidizing method include a corona discharge treatment, a plasma discharge treatment, a chromic acid treatment (wet process), a hot air treatment, an ozone treatment, an ultraviolet ray irradiation treatment, and the like, and examples of the roughening treatment include a sand blasting treatment, a solvent treatment, and the like.

[Release Material]

As the release material to be used in one embodiment of the present invention, a release sheet having both surfaces subjected to a release treatment, a release sheet having one surface subjected to a release treatment, and the like are usable, and examples thereof include a substrate for the release material having coated thereon a release agent, and the like.

The release treatment is preferably performed on a flat release material without a relief shape formed thereon (for example, a release material having no emboss pattern formed thereon).

Examples of the substrate for the release material include the paper substrate, the resin film or sheet, and the substrate containing a paper substrate laminated with a resin described above used as the substrate of the pressure sensitive adhesive sheet of one embodiment of the present invention.

Examples of the release agent include a rubber elastomer, such as a silicone resin, an olefin resin, an isoprene resin, a butadiene resin, etc., a long-chain alkyl resin, an alkyd resin, a fluorine resin, and the like.

Though the thickness of the release material is not particularly limited, it is preferably 10 to 200 μm, more preferably 25 to 170 μm, and still more preferably 35 to 80 μm.

[Resin Layer]

As shown in FIG. 1, the resin layer 12 which the pressure sensitive adhesive sheet of the present invention has is preferably one containing the resin part (X) containing a resin and the particle part (Y) consisting of fine particles.

The resin part (X) means a part containing a component other than the fine particles to be contained in the resin layer. Namely, not only the resin but also a component other than the fine particles, such as a tackifier, a crosslinking agent, an ordinary additive, etc., is included in the "resin part (X)".

Meanwhile, the particle part (Y) means a part consisting of fine particles contained in the resin layer.

When the particle part (Y) is contained in the resin layer, the shape retentive property after being attached can be improved, and in the case of using the resulting pressure sensitive adhesive sheet at a high temperature, generation of blister can be effectively inhibited.

Regarding the configuration of distribution of the resin part (X) and the particle part (Y) in the resin layer 12, the resin parts (X) and the particle parts (Y) may be distributed almost evenly as one configuration, or as a different configuration, a site mainly containing the resin parts (X) and a site mainly containing the particle parts (Y) may be locally divided.

It is preferred that the resin layer which the pressure sensitive adhesive sheet of one embodiment of the present invention has additionally has a void part (Z) in addition to the resin part (X) and the particle part (Y). When the resin layer has the void part (Z), the blister resistance of the pressure sensitive adhesive sheet can be improved.

The void part (Z) includes voids existing between the aforementioned fine particles as well as, when the aforementioned fine particles are secondary particles, voids existing inside the secondary particles.

In the case where the resin layer has a multilayer structure, even though the void part (Z) exists in the process of forming the resin layer or just after formation of the layer, the resin part (X) may flow into the void part (Z), and therefore, the voids may disappear to give a resin layer not having the void part (Z).

However, even in the case where the void part (Z) having existed in the resin layer for a period of time has disappeared, in the pressure sensitive adhesive sheet that is one embodiment of the present invention, the concave portion exists on the surface (α) of the resin layer, and therefore, the air escape property is good; and the resin layer has the particle part (Y), and therefore, the blister resistance is excellent, too.

From the viewpoint of improving the air escape property and the blister resistance of the pressure sensitive adhesive sheet, the shear storage elastic modulus at 100° C. of the resin layer which the pressure sensitive adhesive sheet of one embodiment of the present invention has is preferably $9.0 \times 10^3$ Pa or more, more preferably $1.0 \times 10^4$ Pa or more, and still more preferably $2.0 \times 10^4$ Pa or more.

In the present invention, the shear storage elastic modulus at 100° C. of the resin layer means a value measured with a viscoelastometer (for example, an apparatus name: "DYNAMIC ANALYZER RDA II", manufactured by Rheometrics Inc.) at a frequency of 1 Hz.

The total thickness of the resin layer is preferably 1 to 300 μm, more preferably 5 to 150 μm, and still more preferably 10 to 75 μm.

In the pressure sensitive adhesive sheet of the present invention, at least the surface (α) of the resin layer on the side opposite to the side on which at least the substrate or the release material is provided has pressure sensitive adhesiveness, but the surface (β) of the resin layer on the side on which the substrate or the release material is provided may also has pressure sensitive adhesiveness.

The pressure sensitive adhesive strength of the surface (α) of the resin layer of the pressure sensitive adhesive sheet of one embodiment of the present invention is preferably 0.5 N/25 mm or more, more preferably 2.0 N/25 mm or more, still more preferably 3.0 N/25 mm or more, yet still more preferably 4.0 N/25 mm or more, and even yet still more preferably 7.0 N/25 mm or more.

In the case where the surface (β) of the resin layer also has pressure sensitive adhesiveness, the pressure sensitive adhesive strength of the surface (β) preferably belongs to the aforementioned range.

The value of the pressure sensitive adhesive strength of the pressure sensitive adhesive sheet means a value measured by the method described in Examples.

<Multilayer Structure of Resin Layer>

The resin layer may be a multilayer structure configured of two or more layers.

As the resin layer that is such a multilayer structure, there is exemplified a multilayer structure formed by laminating a layer (Xβ) mainly containing the resin part (X), a layer (Y1) containing the particle part (Y) in an amount of 15% by mass or more, and a layer (Xα) mainly containing the resin part (X) in this order from the side on which the substrate or the release material is provided, like in the pressure sensitive adhesive sheet 1a in FIG. 1.

The configuration of the multilayer structure of the resin layer may also be a mixed layer configuration where the boundary between the two layers to be laminated cannot be discerned.

Namely, the configuration of the resin layer 12 which the pressure sensitive adhesive sheet 1a in FIG. 1 has may also be a mixed layer configuration where the boundary between the layer (Xβ) and the layer (Y1), and/or the boundary between the layer (Y1) and the layer (Xα) cannot be discerned.

The configuration of the resin that is the multilayer structure is hereunder described by reference to, as one example, the resin layer 12 configured of three layers of the layer (Xβ), the layer (Y1), and the layer (Xα), which the pressure sensitive adhesive sheet 1a in FIG. 1 has.

The layer (Xβ) and the layer (Xα) are a layer mainly containing the resin part (X) but may also contain a particle part (Y). However, the content of the particle part (Y) in each of the layer (Xβ) and the layer (Xα) is independently less than 15% by mass relative to the total mass (100% by mass) of the layer (Xβ) or the layer (Xα) and is smaller than the content of the resin in the layer (Xβ) or the layer (Xα).

Namely, with respect to the content of the particle part (Y), the layer (Xβ) and the layer (Xα) are distinguished from the layer (Y1).

The layer (Xβ) and the layer (Xα) may have the aforementioned void part (Z), in addition to the resin part (X) and the particle part (Y).

The content of the resin part (X) in each of the layer (Xβ) and the layer (Xα) is independently typically more than 85% by mass, preferably 87 to 100% by mass, more preferably 90 to 100% by mass, still more preferably 95 to 100% by mass, and yet still more preferably 100% by mass relative to the total mass (100% by mass) of the layer (Xβ) or the layer (Xα).

The aforementioned "content of the resin part (X)" means a total content of the components other than the fine particles, such as a resin, a tackifier, a crosslinking agent, an ordinary additive, etc., constituting the resin part (X) contained in the layer (Xβ) or the layer (Xα).

The content of the fine particles constituting each of the particle part (Y) in the layer (Xβ) and the layer (Xα) is independently less than 15% by mass, preferably 0 to 13% by mass, more preferably 0 to 10% by mass, still more preferably 0 to 5% by mass, and yet still more preferably 0% by mass relative to the total mass (100% by mass) of the layer (Xβ) or the layer (Xα).

In the present invention, the "content of the fine particles in each of the layer (Xβ) and the layer (Xα)" may be considered to be the content of the fine particles in the total amount (100% by mass (but excluding a diluent solvent)) of the resin composition that is the forming material for the layer (Xβ) or the layer (Xα).

The content of the resin in the layer (Xα) is typically 30 to 100% by mass, preferably 40 to 100% by mass, more preferably 50 to 100% by mass, and still more preferably 60 to 100% by mass relative to the total amount (100% by mass) of the layer (Xα).

Meanwhile, the content of the resin in the layer (Xβ) is typically 50 to 100% by mass, preferably 65 to 100% by mass, more preferably 75 to 100% by mass, and still more preferably 85 to 100% by mass relative to the total amount (100% by mass) of the layer (Xβ).

In the present invention, the "content of the resin in each of the layer (Xβ) and the layer (Xα)" may be considered to be the content of the resin in the total amount (100% by mass (but excluding a diluent solvent)) of the resin composition that is the forming material for the layer (Xβ) or the layer (Xα).

The layer (Y1) may be a layer formed of the particle part (Y) alone, may also be a layer containing the resin part (X) together with the particle part (Y), and may further be a layer having the void part (Z).

The content of the fine particles constituting the particle part (Y) in the layer (Y1) is typically 15% by mass or more, preferably 20 to 100% by mass, more preferably 25 to 90% by mass, still more preferably 30 to 85% by mass, and yet still more preferably 35 to 80% by mass relative to the total mass (100% by mass) of the layer (Y1).

The content of the resin in the layer (Y1) is typically 0 to 85% by mass, preferably 1 to 80% by mass, more preferably 5 to 75% by mass, still more preferably 10 to 70% by mass, and yet still more preferably 20 to 65% by mass relative to the total mass (100% by mass) of the layer (Y1).

In the present invention, the "content of the fine particles in the layer (Y1)" and the "content of the resin in the layer (Y1)" may be considered to be each the content of the fine particles or the resin in the total amount (100% by mass (but excluding a diluent solvent)) of the composition that is the forming material for the layer (Y1).

In one embodiment of the present invention, the layer (Xα) is preferably a layer formed of a composition (xα) containing a resin and having a content of fine particles of less than 15% by mass.

Similarly, the layer (Xβ) is preferably a layer formed of a composition (xβ) containing a resin and having a content of fine particles of less than 15% by mass.

The aforementioned layer (Y1) is preferably a layer formed of a composition (y) containing 15% by mass or more of fine particles.

Suitable embodiments (containing components, contents, etc.) of the composition (xα), the composition (xβ), and the composition (y1) are those as described later.

<Resin Part (X)>

The resin part (X) constituting the resin layer is a part containing any other component than fine particles contained in the resin layer, and in this point, this is differentiated from the particle part (Y).

The resin part (X) may contain a tackifier, a crosslinking agent, an ordinary additive, and so on together with the resin.

The content of the resin in the resin part (X) is typically 30% by mass or more, preferably 40% by mass or more, more preferably 50% by mass or more, still more preferably 55% by mass or more, yet still more preferably 60% by mass or more, and even yet still more preferably 70% by mass or more, and preferably 100% by mass or less, and more preferably 99.9% by mass or less, relative to the total amount (100% by mass) of the resin part (X).

In the present invention, a value of the content of the resin in the resin composition serving as the forming material for the resin part (X) may be considered to be the aforementioned "content of the resin in the resin part (X)".

The aforementioned resin which is contained in the resin part (X) preferably contains a pressure sensitive adhesive resin from the viewpoint of revealing pressure sensitive adhesiveness on the surface (α) of the resin layer to be formed.

In particular, in the case where the resin layer has a multilayer structure formed by laminating a layer (Xβ), a layer (Y1), and a layer (Xα) in this order from the side on which a substrate or a release material is provided, like in the pressure sensitive adhesive sheet 1a, etc. of FIG. 1(a), from the aforementioned viewpoints, it is preferred that at least the layer (Xα) contains a pressure sensitive adhesive resin. In addition, from the viewpoint of providing a configuration of a double-sided pressure sensitive adhesive sheet and from the viewpoint of improving the adhesion to the substrate, it is preferred that at least the layer (Xα) and the layer (Xβ) contain a pressure sensitive adhesive resin.

Examples of the pressure sensitive adhesive resin include an acrylic resin, a urethane resin, a rubber resin, a silicone resin, and the like.

Among these adhesive resins, an acrylic resin is preferably contained from the viewpoints of making the pressure sensitive adhesion characteristics and the weather resistance good and facilitating the formation of concave portions and flat faces on the surface (α) of the resin layer.

The content of the acrylic resin is preferably 25 to 100% by mass, more preferably 50 to 100% by mass, still more preferably 70 to 100% by mass, yet still more preferably 80 to 100% by mass, and even yet still more preferably 100% by mass relative to the total amount (100% by mass) of the resin contained in the resin part (X).

From the viewpoint of facilitating the formation of concave portions and flat faces on the surface (α) of the resin layer, the resin part (X) preferably contains a resin having a functional group and more preferably contains an acrylic resin having a functional group.

In particular, in the case where the resin layer has a multilayer structure formed by laminating a layer (Xβ), a layer (Y1), and a layer (Xα) in this order from the side on which a substrate or a release material is provided, like in the pressure sensitive adhesive sheet 1a, etc. of FIG. 1(a), from the aforementioned viewpoints, it is preferred that at least the layer (Y1) contains a resin having a functional group.

The functional group is a group to be a crosslinking start point with a crosslinking agent, and examples thereof include a hydroxy group, a carboxy group, an epoxy group, an amino group, a cyano group, a keto group, an alkoxysilyl group, and the like, with a carboxy group being preferred.

It is preferred that the resin part (X) further contains a crosslinking agent together with the aforementioned resin having a functional group. In particular, in the case where the resin layer has the aforementioned multilayer structure, it is preferred that at least the layer (Y1) contains a crosslinking agent together with the aforementioned resin having a functional group.

Examples of the crosslinking agent include an isocyanate crosslinking agent, an epoxy crosslinking agent, an aziridine crosslinking agent, a metal chelate crosslinking agent, and the like.

Examples of the isocyanate crosslinking agent include aromatic polyisocyanates, such as tolylene diisocyanate, diphenylmethane diisocyanate, xylylene diisocyanate, etc.; aliphatic polyisocyanates, such as hexamethylene diisocyanate, etc.; alicyclic polyisocyanates, such as isophorone diisocyanate, hydrogenated diphenylmethane diisocyanate, etc.; biuret forms and isocyanurate forms of these compounds, and adduct forms that are a reaction product with a low-molecular active hydrogen-containing compound (e.g., ethylene glycol, propylene glycol, neopentyl glycol, trimethylolpropane, castor oil, etc.); and the like.

Examples of the epoxy crosslinking agent include ethylene glycol glycidyl ether, 1,3-bis(N,N-diglycidylaminomethyl)cyclohexane, N,N,N',N'-tetraglycidyl-m-xylylenediamine, 1,6-hexanecliol diglycidyl ether, trimethylolpropane diglycidyl ether, diglycidylaniline, diglycidylamine, and the like.

Examples of the aziridine crosslinking agent include cliphenylmethane-4,4'-bis(1-aziridinecarboxamide), trimethylolpropane tri-β-aziridinyl propionate, tetramethylolmethane tri-β-aziridinyl propionate, toluene-2,4-bis(1-aziridinecarboxamide), triethylenemelamine, bisisophthaloyl-1-(2-methylaziridine), tris-1-(2-methylaziridine)phosphine, trimethylolpropane tri-β-(2-methylaziridine) propionate, and the like.

The metal chelate crosslinking agent includes chelate compounds in which the metal atom is aluminum, zirconium, titanium, zinc, iron, tin, or the like. From the viewpoint of facilitating the formation of concave portions and flat faces on the surface (α) of the resin layer, an aluminum chelate crosslinking agent is preferred.

Examples of the aluminum chelate crosslinking agent include diisopropoxyaluminum monooleyl acetoacetate, monoisopropoxyaluminum bisoleyl acetoacetate, monoisopropoxyaluminum monooleate monoethyl acetoacetate, diisopropoxyaluminum monolauryl acetoacetate, diisopropoxyaluminum monostearyl acetoacetate, diisopropoxyaluminum monoisostearyl acetoacetate, and the like.

These crosslinking agents may be used either alone or in combination of two or more thereof.

Among these, from the viewpoint of facilitating the formation of concave portions and flat faces on the surface (α) of the resin layer, the resin part (X) preferably contains one or more selected from a metal chelate crosslinking agent and an epoxy crosslinking agent, more preferably contains a metal chelate crosslinking agent, and still more preferably contains an aluminum chelate crosslinking agent.

The content of the crosslinking agent in the resin part (X) is preferably 0.01 to 15 parts by mass, more preferably 0.1 to 10 parts by mass, and still more preferably 0.3 to 7.0 parts by mass relative to 100 parts by mass of the resin having a functional group to be contained in the resin part (X).

As one embodiment of the present invention, from the viewpoint of facilitating the formation of concave portions and flat faces on the surface (α) of the resin layer, it is preferred that the resin part (X) contains both a metal chelate crosslinking agent and an epoxy crosslinking agent.

In the case where the resin part (X) contains both a metal chelate crosslinking agent and an epoxy crosslinking agent, from the aforementioned viewpoints, the content ratio of the metal chelate crosslinking agent to the epoxy crosslinking agent [(metal chelate crosslinking agent)/(epoxy crosslinking agent)] in the resin part (X) is preferably 10/90 to 99.5/0.5, more preferably 50/50 to 99.0/1.0, still more preferably 65/35 to 98.5/1.5, and yet still more preferably 75/25 to 98.0/2.0 in terms of a mass ratio.

From the viewpoint of more improving the pressure sensitive adhesion characteristics of the surface (α), it is preferred that the resin part (X) further contains a tackifier together with the pressure sensitive adhesive resin. In particular, in the case where the resin layer is the aforementioned multilayer structure, it is preferred that the layer (Xα) contains a pressure sensitive adhesive resin and a tackifier.

The tackifier to be used in the present invention is a component for auxiliary improving the pressure sensitive adhesive strength of the pressure sensitive adhesive resin, refers to an oligomer whose mass average molecular weight (Mw) is typically less than 10,000, and is differentiated from the aforementioned pressure sensitive adhesive resin.

The mass average molecular weight (Mw) of the tackifier is preferably 400 to 8,000, more preferably 5,000 to 5,000, and still more preferably 800 to 3,500.

Examples of the tackifier include rosin resins, such as a rosin resin, a rosin ester resin, a rosin-modified phenol resin, etc.; hydrogenated rosin resins obtained by hydrogenating such a rosin resin; terpene resins, such as a terpene resin, an aromatic modified terpene resin, a terpene phenol resin, etc.; hydrogenated terpene resins obtained by hydrogenating such a terpene resin; styrene resins obtained by copolymerizing a styrene monomer, such as α-methylstyrene, β-methylstyrene, etc., and an aliphatic monomer; hydrogenated styrene resins obtained by hydrogenating such a styrene resin; C5 petroleum resins obtained by copolymerizing a C5 fraction, such as pentene, isoprene, piperine, 1,3-pentadiene, etc., and hydrogenated petroleum resins of such a C5 petroleum resin; C9 petroleum resins obtained by copolymerizing a C9 fraction, such as indene, vinyltoluene, etc., as formed by hydrocracking of petroleum naphtha, and hydrogenated petroleum resins of such a C9 petroleum resin; and the like.

The tackifier to be used in the present invention may be used either alone or in combination of two or more thereof having a different softening point or structure from each other.

The softening point of the tackifier is preferably 80° C. or higher, more preferably 80 to 180° C., still more preferably 83 to 170° C., and yet still more preferably 85 to 150° C.

In the present invention, the "softening point" of the tackifier means a value measured in conformity with JIS K2531.

In the case of using two or mole plural tackifiers, it is preferred that the weight average of the softening points of those plural tackifiers belongs to the aforementioned range.

In the case where the tackifier is contained in the resin part (X), the content of the tackifier is preferably 1 part by mass or more, more preferably 1 to 200 parts by mass, still more preferably 3 to 150 parts by mass, and yet still more preferably 5 to 90 parts by mass relative to 100 parts by mass of the pressure sensitive adhesive resin which is contained in the resin part (X).

The resin part (X) may contain an ordinary additive other than the aforementioned crosslinking agent and tackifier.

Examples of the ordinary additive include an antioxidant, a softener (plasticizer), a rust inhibitor, a pigment, a dye, a retardant, a reaction accelerator, a UV absorbent, and the like.

These ordinary additives may be each used either alone or in combination of two or more thereof.

In the case where these ordinary additives are contained, the content of each ordinary additive is preferably 0.0001 to 60 parts by mass, and more preferably 0.001 to 50 parts by mass relative to 100 parts by mass of the resin.

The aforementioned resin which is contained in the resin part (X) may be used either alone or in combination of two or more thereof.

The forming material for the resin part (X) of the resin layer which the pressure sensitive adhesive sheet of the present invention has is preferably a pressure sensitive adhesive containing a pressure sensitive adhesive resin having a functional group, more preferably an acrylic pressure sensitive adhesive containing an acrylic resin (A) having a functional group (hereinafter also referred to simply as "acrylic resin (A)"), and still more preferably an acrylic pressure sensitive adhesive containing an acrylic resin (A) having a functional group and a crosslinking agent (B).

The acrylic pressure sensitive adhesive may be any of a solvent type or an emulsion type.

The aforementioned acrylic pressure sensitive adhesive which is suitable as the forming material for the resin part (X) is hereunder described.

Examples of the acrylic resin (A) contained in the acrylic pressure sensitive adhesive include a polymer having a structural unit derived from an alkyl (meth)acrylate having a linear or branched alkyl group, a polymer having a structural unit derived from a (meth)acrylate having a cyclic structure, and the like.

The mass average molecular weight (Mw) of the acrylic resin (A) is preferably 50,000 to 1,500,000, more preferably 150,000 to 1,300,000, still more preferably 250,000 to 1,100,000, and yet still more preferably 350,000 to 900,000.

The acrylic resin (A) preferably contains an acrylic copolymer (A1) having a structural unit (a1) derived from an alkyl (meth)acrylate (a1') having an alkyl group with 1 to 18 carbon atoms (hereinafter also referred to as "monomer (a1')") and a structural unit (a2) derived from a functional group-containing monomer (a2') (hereinafter also referred to as "monomer (a2')"), and more preferably contains an acrylic copolymer (A1).

The content of the acrylic copolymer (A1) is preferably 50 to 100% by mass, more preferably 70 to 100% by mass, still more preferably 80 to 100% by mass, and yet still more preferably 90 to 100% by mass relative to the total amount (100% by mass) of the acrylic resin (A) in the acrylic pressure sensitive adhesive.

The copolymerization morphology of the acrylic copolymer (A1) is not particularly limited, and the copolymer may be any of a block copolymer, a random copolymer, or a graft copolymer.

From the viewpoint of improving the pressure sensitive adhesion characteristics, the carbon number of the alkyl group which the monomer (a1') has is more preferably 4 to 12, still more preferably 4 to 8, and yet still more preferably 4 to 6.

Examples of the monomer (a1') include methyl (meth)acrylate, ethyl (meth)acrylate, propyl (meth)acrylate, butyl (meth)acrylate, 2-ethylhexyl (meth)acrylate, lauryl (meth)acrylate, tridecyl (meth)acrylate, stearyl (meth)acrylate, and the like.

Among these, butyl (meth)acrylate and 2-ethylhexyl (meth)acrylate are preferred, and butyl (meth)acrylate is more preferred.

The content of the structural unit (a1) is preferably 50 to 99.5% by mass, more preferably 60 to 99% by mass, still more preferably 70 to 95% by mass, and yet still more preferably 80 to 93% by mass relative to all the structural units (100% by mass) of the acrylic copolymer (A1).

Examples of the monomer (a2') include a hydroxy group-containing monomer, a carboxy group-containing monomer, an epoxy group-containing monomer, an amino group-containing monomer, a cyano group-containing monomer, a keto group-containing monomer, an alkoxysilyl group-containing monomer, and the like.

Among these, a carboxy group-containing monomer is more preferred.

Examples of the carboxy group-containing monomer include (meth)acrylic acid, maleic acid, fumaric acid, itaconic acid, and the like, with (meth)acrylic acid being preferred.

The content of the structural unit (a2) is preferably 0.5 to 50% by mass, more preferably 1 to 40% by mass, still more preferably 5 to 30% by mass, and yet still more preferably 7 to 20% by mass relative to all the structural units (100% by mass) of the acrylic copolymer (A1).

The acrylic copolymer (A1) may have a structural unit (a3) derived from any other monomer (a3') than the aforementioned monomers (a1') and (a2').

Examples of the other monomer (a3') include (meth)acrylates having a cyclic structure, such as cyclohexyl (meth)acrylate, benzyl (meth)acrylate, isobornyl (meth)acrylate, dicyclopentanyl (meth)acrylate, dicyclopentenyl (meth)acrylate, dicyclopentenyloxyethyl (meth)acrylate, imido(meth)acrylate, etc.; vinyl acetate, acrylonitrile, styrene, and the like.

The content of the structural unit (a3) is preferably 0 to 30% by mass, more preferably 0 to 20% by mass, still more preferably 0 to 10% by mass, and yet still more preferably 0 to 5% by mass relative to all the structural units (100% by mass) of the acrylic copolymer (A1).

The aforementioned monomers (a1') to (a3') may be each used either alone or in combination of two or more thereof.

A method for synthesis of the acrylic copolymer (A1) component is not particularly limited. For example, the copolymer is produced according to a method including dissolving raw material monomers in a solvent and polymerizing them in a mode of solution polymerization in the presence of a polymerization initiator, a chain transfer agent, and the like, or a method of emulsion polymerization in an aqueous system using raw material monomers in the presence of an emulsifier, a polymerization initiator, a chain transfer agent, a dispersant, and the like.

The crosslinking agent (B) to be contained in the aforementioned acrylic pressure sensitive adhesive includes those as described above, but from the viewpoint of bettering the pressure sensitive adhesion characteristics and from the viewpoint of facilitating the formation of concave portions and flat faces on the surface ($\alpha$) of the resin layer, one or more selected from a metal chelate crosslinking agent and an epoxy crosslinking agent are preferably contained, a metal chelate crosslinking agent is more preferably contained, and an aluminum chelate crosslinking agent is still more preferably contained.

As one embodiment of the present invention, from the viewpoint of improving the shape retentivity of the plural concave portions existing on the surface ($\alpha$) of the resin layer, the crosslinking agent (B) preferably contains both a metal chelate crosslinking agent and an epoxy crosslinking agent.

The content of the crosslinking agent (B) is preferably 0.01 to 15 parts by mass, more preferably 0.1 to 10 parts by mass, and still more preferably 0.3 to 7.0 parts by mass relative to 100 parts by mass of the acrylic resin (A) in the aforementioned acrylic pressure sensitive adhesive.

In the case where a metal chelate crosslinking agent and an epoxy crosslinking agents are used in combination, the content ratio of the metal chelate crosslinking agent to the epoxy crosslinking agent [(metal chelate crosslinking agent)/(epoxy crosslinking agent)] is preferably 10/90 to 99.5/0.5, more preferably 50/50 to 99.0/1.0, still more preferably 65/35 to 98.5/1.5, and yet still more preferably 75/25 to 98.0/2.0 in terms of a mass ratio.

The acrylic pressure sensitive adhesive to be used in one embodiment of the present invention may contain any ordinary additive within a range where the effects of the present invention are not impaired. Examples of the ordinary additive include those as described above, and the content of the ordinary additive is also as described above.

From the viewpoint of more improving the pressure sensitive adhesion characteristics of the surface ($\alpha$), it is preferred that the acrylic pressure sensitive adhesive to be used in one embodiment of the present invention further contains a tackifier. Examples of the tackifier include those as described above, and the content of the tackifier is also as described above.

The acrylic pressure sensitive adhesive to be used in one embodiment of the present invention may contain any other pressure sensitive adhesive resin than the acrylic resin (A) (for example, a urethane resin, a rubber resin, a silicone resin, etc.) within a range where the effects of the present invention are not impaired.

The content of the acrylic resin (A) in the acrylic pressure sensitive adhesive is preferably 50 to 100% by mass, more preferably 70 to 100% by mass, still more preferably 80 to 100% by mass, and yet still more preferably 100% by mass relative to the total amount (100% by mass) of the pressure sensitive adhesive resin contained in the acrylic pressure sensitive adhesive.

<Particle Part (Y)>

The resin layer which the pressure sensitive adhesive sheet of one embodiment of the present invention has preferably contains a particle part (Y) consisting of fine particles.

From the viewpoint of improving the air escape property and the blister resistance of the pressure sensitive adhesive sheet and from the viewpoint of facilitating the formation of concave portions and flat faces on the surface (α) of the resin layer, the average particle diameter of the fine particles is preferably 0.01 to 100 μm, more preferably 0.05 to 25 μm, and still more preferably 0.1 to 10 μm.

The fine particles to be used in one embodiment of the present invention are not particularly limited, and examples thereof include inorganic particles, such as silica particles, metal oxide particles, barium sulfate, calcium carbonate, magnesium carbonate, glass beads, smectite, etc.; organic particles, such as acrylic beads, etc.; and the like.

Among these fine particles, one or more selected from silica particles, metal oxide particles, and smectite are preferred, and silica particles are more preferred.

The silica particles to be used in one embodiment of the present invention may be any one of dry type silica and wet type silica.

The silica particles to be used in one embodiment of the present invention may also be an organic modified silica having been surface-modified with an organic compound having a reactive functional group or the like, an inorganic modified silica having been surface-treated with an inorganic compound, such as sodium aluminate, sodium hydroxide, etc.; an organic/inorganic modified silica having been surface-treated with any of these organic compounds and inorganic compounds, or an organic/inorganic modified silica having been surface-treated with an organic/inorganic hybrid material of a silane coupling agent; and the like.

These silica particles may be in the form of a mixture of two or more thereof.

The mass concentration of silica in the silica particles is preferably 70 to 100% by mass, more preferably 85 to 100% by mass, and still more preferably 90 to 100% by mass relative to the total amount (100% by mass) of the silica particles.

From the viewpoint of improving the air escape property and the blister resistance of the pressure sensitive adhesive sheet and from the viewpoint of facilitating the formation of concave portions and flat faces on the surface (α) of the resin layer, the volume average secondary particle diameter of the silica particles to be used in one embodiment of the present invention is preferably 0.5 to 10 μm, more preferably 1 to 8 μm, and still more preferably 1.5 to 5 μm.

In the present invention, the value of the volume average secondary particle diameter of the silica particles is a value determined through measurement of particle size distribution according to a Coulter counter method using Multisizer III or the like.

Examples of the metal oxide particles include particles made of a metal oxide selected from titanium oxide, alumina, boehmite, chromium oxide, nickel oxide, copper oxide, titanium oxide, zirconium oxide, indium oxide, zinc oxide, and composite oxides thereof, and the like, and also include sol particles composed of those metal oxides.

Examples of the smectite include montmorillonite, beidellite, hectorite, saponite, stevensite, nontronite, sauconite, and the like.

The mass retention rate after heating the resin layer which the pressure sensitive adhesive sheet of one embodiment of the present invention has at 800° C. for 30 minutes is preferably 3 to 90% by mass, more preferably 5 to 80% by mass, still more preferably 7 to 70% by mass, and yet still more preferably 9 to 60% by mass.

The mass retention rate can be considered to indicate the content (% by mass) of the fine particles contained in the resin layer.

When the mass retention rate is 3% by mass or more, a pressure sensitive adhesive sheet which is excellent in air escape property and blister resistance may be provided. In addition, in production of the pressure sensitive adhesive sheet of the present invention, concave portions and flat faces can be readily formed on the surface (α) of the resin layer. On the other hand, when the mass retention rate is 90% by mass or less, a pressure sensitive adhesive sheet in which the film strength of the resin layer is high and which is excellent in water resistance and chemical resistance may be provided.

[Production Method of Pressure Sensitive Adhesive Sheet]

A production method of the pressure sensitive adhesive sheet of the present invention is hereunder described.

Thought the production method of the pressure sensitive adhesive sheet of the present invention is not particularly limited, from the viewpoint of productivity and from the viewpoint of facilitating the formation of concave portions and flat faces on the surface (α) of the resin layer, a method including at least the following steps (1) and (2) is preferred.

Step (1): A step of forming a coating film (x') formed by a composition (x) containing the resin and having a content of the fine particles of less than 15% by mass, and a coating film (y') formed by a composition (y) having the fine particles in an amount of 15% by mass or more.

Step (2): A step of drying the coating film (x') and the coating film (y') formed in the step (1) simultaneously.

<Step (1)>

The step (1) is a step of forming a coating film (x') formed by a composition (x) containing the resin and having a content of the fine particles of less than 15% by mass, and a coating film (y') formed by a composition (y) having the fine particles in an amount of 15% by mass or more.

The composition (x) is a forming material for the resin part (X), and it preferably contains a crosslinking agent together with the aforementioned resin and may further contain a tackifier as well as the aforementioned ordinary additive.

The composition (y) is a forming material for the particle part (Y), and may further contain a resin, a crosslinking agent, and a tackifier as well as the aforementioned ordinary additive. The composition (y) containing those components other than the fine particles, such as a resin, etc., serves not only as the forming material for the particle part (Y) but also as the forming material for the resin part (X).

(Composition (x))

Examples of the resin contained in the composition (x) include a resin constituting the aforementioned resin part (X), and the resin is preferably a pressure sensitive adhesive resin having a functional group, more preferably the aforementioned acrylic resin (A) having a functional group, and still more preferably the aforementioned acrylic copolymer (A1).

The content of the resin in the composition (x) is typically 30% by mass or more, preferably 40% by mass or more, more preferably 50% by mass or more, still more preferably 55% by mass or more, yet still more preferably 60% by mass or more, and even yet still more preferably 70% by mass or more, and preferably 100% by mass or less, more preferably 99.9% by mass or less, and still more preferably 95% by mass or less, relative to the total amount (100% by mass (but excluding diluent solvent)) of the composition (x).

Examples of the crosslinking agent to be contained in the composition (x) include the crosslinking agent to be contained in the aforementioned resin part (X). One or more selected from a metal chelate crosslinking agent and an epoxy crosslinking agent are preferably contained, and a metal chelate crosslinking agent is more preferably contained.

Furthermore, from the viewpoint of improving the shape retentivity of the plural concave portions existing on the surface (α) of the resin layer, it is preferred that the composition (x) contains both a metal chelate crosslinking agent and an epoxy crosslinking agent.

In the case where the composition (x) contains both a metal chelate crosslinking agent and an epoxy crosslinking agent, the content ratio of the metal chelate crosslinking agent to the epoxy crosslinking agent in the composition (x) [(metal chelate crosslinking agent)/(epoxy crosslinking agent)] is preferably 10/90 to 99.5/0.5, more preferably 50/50 to 99.0/1.0, still more preferably 65/35 to 98.5/1.5, and yet still more preferably 75/25 to 98.0/2.0 in terms of a mass ratio.

The content of the crosslinking agent is preferably 0.01 to 15 parts by mass, more preferably 0.1 to 10 parts by mass, and still more preferably 0.3 to 7.0 parts by mass relative to 100 parts by mass of the resin contained in the composition (x).

The composition (x) is preferably an acrylic pressure sensitive adhesive containing the aforementioned acrylic resin (A) having a functional group and crosslinking agent (B), more preferably an acrylic pressure sensitive adhesive containing the aforementioned acrylic copolymer (A1) and crosslinking agent (B). In addition, the acrylic pressure sensitive adhesive may further contain a tackifier or an ordinary additive.

The details of the aforementioned acrylic pressure sensitive adhesive are as described above.

The composition (x) may contain the aforementioned fine particles.

However, the content of the fine particles in the composition (x) is less than 15% by mass and is smaller than the content of the resin contained in the composition (x).

Specifically, the content of the fine particles in the composition (x) is less than 15% by mass, preferably 0 to 13% by mass, more preferably 0 to 10% by mass, still more preferably 0 to 5% by mass, and yet still more preferably 0% by mass relative to the total amount (100% by mass (but excluding diluent solvent)) of the composition (x).

(Composition (y))

The composition (y) is a forming material for the particle part (Y) and contains at least the aforementioned fine particles in an amount of 15% by mass or more. From the viewpoint of dispersibility of the fine particles, the composition (y) preferably contains a resin together with the fine particles, and more preferably further contains a crosslinking agent together with the resin. In addition, the composition (y) may further contain a tackifier or an ordinary additive.

The components other than the fine particles to be contained in the composition (y) (a resin, a crosslinking agent, a tackifier, and an ordinary additive) serve as the forming material for the resin part (X).

Examples of the fine particles to be contained in the composition (y) include those as described above, and from the viewpoint of forming the void part (Z) in the resin layer to provide a pressure sensitive adhesive sheet having improved blister resistance, one or more selected from silica particles, metal oxide particles, and smectite are preferred.

From the viewpoint of facilitating the formation of irregular concave portions on the surface (α) of the resin layer through self-formation of the resin layer and flat faces, the content of the fine particles in the composition (y) is 15% by mass or more, preferably 20 to 100% by mass, more preferably 25 to 90% by mass, still more preferably 30 to 85% by mass, and yet still more preferably 35 to 80% by mass relative to the total amount (100% by mass (but excluding diluent solvent)) of the resin composition (y).

Examples of the resin to be contained in the composition (y) include the same resins as those of the resin to be contained in the aforementioned composition (x), and it is preferred that the same resin as in the composition (x) is contained. These resins may be used either alone or in combination of two or more thereof.

More specifically, the resin to be contained in the composition (y) is preferably a resin having a functional group, more preferably the aforementioned acrylic resin (A) having a functional group, and still more preferably the aforementioned acrylic copolymer (A1).

The content of the resin in the composition (y) is typically 0 to 85% by mass, preferably 1 to 80% by mass, more preferably 5 to 75% by mass, still more preferably 10 to 70% by mass, and yet still more preferably 20 to 65% by mass relative to the total amount (100% by mass (but excluding diluent solvent)) of the composition (y).

Examples of the crosslinking agent to be contained in the composition (y) include the same materials as those in the crosslinking agent to be contained in the aforementioned resin part (X). Among these, it is preferred that the composition (y) contains one or more selected from a metal chelate crosslinking agent and an epoxy crosslinking agent, and it is more preferred that the composition (y) contains a metal chelate crosslinking agent. Furthermore, as one embodiment of the present invention, it is preferred that the composition (y) contains both a metal chelate crosslinking agent and an epoxy crosslinking agent.

In the case where the composition (y) contains both a metal chelate crosslinking agent and an epoxy crosslinking agent, a suitable range of the content ratio (mass ratio) of the metal chelate crosslinking agent to the epoxy crosslinking agent in the composition (y) is the same as in the aforementioned composition (x).

The content of the crosslinking agent in the composition (y) is preferably 0.01 to 15 parts by mass, more preferably 0.1 to 10 parts by mass, and still more preferably 0.3 to 7.0 parts by mass relative to 100 parts by mass of the resin to be contained in the composition (y).

(Formation Method of Coating Films (x') and (y'))

For facilitating the formation of a coating film, it is preferred that a solvent is blended in the composition (x) or (y) to give a solution of the composition.

Examples of the solvent include water, organic solvents, and the like.

Examples of the organic solvent include toluene, ethyl acetate, butyl acetate, methyl ethyl ketone, methyl isobutyl ketone, methanol, ethanol, isopropyl alcohol, t-butanol, sec-butanol, acetylacetone, cyclohexanone, n-hexane, cyclohexane, and the like. These solvents may be used either alone or in combination of two or more thereof.

Though the order of laminating the coating films (x') and (y') to be formed in this step is not particularly limited, it is preferred that the coating film (x') is laminated on the coating film (y').

Regarding the formation method of the coating films (x') and (y'), there may be employed a successive formation method of forming a coating film (y') and then forming a coating film (x') on the coating film (y'), or from the viewpoint of productivity, there may also be employed a simultaneous coating method of coating with both the coating film (y') and the coating film (x') using a multilayer coater.

Examples of the coater for use in successive formation include a spin coater, a spray coater, a bar coater, a knife coater, a roll coater, a knife roll coater, a blade coater, a gravure coater, a curtain coater, a die coater, and the like.

Examples of the coater for use in simultaneous coating with a multilayer coater include a curtain coater, a die coater, and the like, and among these, a die coater is preferred from the viewpoint of operability.

In this step (1), after the formation of at least one of the coating film (x') and the coating film (y') and prior to the step (2), a pre-drying treatment may be carried out in such a degree that the curing reaction of the coating film does not proceed.

Though the drying temperature in the pre-drying treatment in this step (1) is generally set within a temperature range in which the formed coating film is not cured, it is preferably lower than the drying temperature in the step (2). A specific drying temperature as prescribed in terms of the "lower than the drying temperature in the step (2)" is preferably 10 to 45° C., more preferably 10 to 34° C., and still more preferably 15 to 30° C.

<Step (2)>

The step (2) is a step of drying the coating film (x') and the coating film (y') formed in the step (1) simultaneously.

In this step, the coating film (x') and the coating film (y') formed are dried simultaneously, whereby a resin layer containing the resin part (X) and the particle part (Y) is formed, and in addition, plural concave portions and flat faces are formed on the surface ($\alpha$) of the resin layer.

From the viewpoint of facilitating the formation of concave portions and flat faces on the surface ($\alpha$) of the resin layer, the drying temperature in this step is preferably 35 to 200° C., more preferably 60 to 180° C., still more preferably 70 to 160° C., and yet still more preferably 80 to 140° C.

When the drying temperature is 35° C. or higher, a pressure sensitive adhesive sheet having good air escape property can be obtained. On the other hand, when the drying temperature is 200° C. or lower, the substrate and the release material which the pressure sensitive adhesive sheet has can be made free from trouble of shrinkage thereof.

When the drying temperature is lower, the height difference of the concave portions to be formed becomes large, but the number of concave portions to be formed tends to decrease.

In the surroundings of the particle part (Y) of the resin layer to be formed in this step, a void part (Z) is readily formed.

The void part (Z) can be readily formed by using one or more selected from silica particles, metal oxide particles, and smectite as the fine particles to be contained in the aforementioned composition (y).

In the case where a pressure sensitive adhesive sheet having a resin layer having a multilayer structure is produced such that the multilayer structure is formed by laminating a layer (X$\beta$) mainly containing the resin part (X), a layer (Y1) containing the particle part (Y) in an amount of 15% by mass or more, and a layer (X$\alpha$) mainly containing the resin part (X) in this order, like the pressure sensitive adhesive sheet 1a of FIG. 1(a), etc. a production method of the following first and second embodiments is preferred.

In the description of the production method of the following first and second embodiments, the "composition (x$\beta$)" and the "composition (x$\alpha$)" are the same as the aforementioned composition (x), unless specifically indicated, and the details of the respective components to be contained in the composition (x$\beta$) or (x$\alpha$) (e.g., the resin, the crosslinking agent, the tackifier, the ordinary additive, the diluent solvent, etc.) (specific exemplification of each component, suitable components, content of component, solid concentration, etc.) are also the same as in the aforementioned composition (x). In addition, the "composition (y)" is also the same as described above.

Production Method of First Embodiment

The production method of the first embodiment includes at least the following steps (1A) and (2A).

Step (1A): A step of forming, on a substrate or a release material, a coating film (x$\beta$') formed by a composition (x$\beta$) containing a resin and having the content of fine particles in an amount of less than 15% by mass, the coating film (y') formed by the component (y) containing the aforementioned fine particles in an amount of 15% by mass or more, and a coating film (x$\alpha$') formed by a composition (x$\alpha$) containing a resin and having the content of fine particles in an amount of less than 15% by mass, as laminated thereon in this order.

Step (2A): A step of drying the coating film (x$\beta$'), the coating film (y'), and the coating film (x$\alpha$') formed in the step (1A) simultaneously.

In the step (1A), it is also preferred that the aforementioned solvent is blended in the composition (x$\beta$), the composition (y), and the composition (x$\alpha$) to form solutions of the respective compositions, and the resultant solutions are used for coating.

Regarding the formation method of the coating film (x$\beta$'), the coating film (y'), and the coating film (x$\alpha$'), there may be employed a successive formation method of forming a coating film (x$\beta$') on a substrate or a release material, then forming a coating film (y') on the coating film (x$\beta$'), and further forming a coating film (x$\alpha$') on the coating film (y'), by using the aforementioned coater, or a simultaneous coating method of forming a coating film (x$\beta$'), a coating film (y'), and a coating film (x$\alpha$') by using the aforementioned multilayer coater.

In the step (1A), after formation of one or more coating films of the coating film (x$\beta$'), the coating film (y'), and the coating film (x$\alpha$') and prior to the step (2A), a pre-drying treatment may be carried out in such a degree that the curing reaction of the coating films does not proceed.

For example, after formation of the coating film (x$\beta$'), the coating film (y'), and the coating film (x$\alpha$'), such a pre-drying treatment may be carried out every time after the formation, or after the formation of the coating film (x$\beta$') and the coating film (y'), the two may be subjected to the aforementioned pre-drying treatment all together, and then the coating film (x$\alpha$') may be formed thereon.

In this step (1A), though the drying temperature for the pre-drying treatment is generally so set as to fall within a temperature range in such a degree that curing of the formed coating film does not proceed, it is preferably lower than the drying temperature in the step (2A). A specific drying temperature as prescribed in terms of the "lower than the drying temperature in the step (2A)" is preferably 10 to 45° C., more preferably 10 to 34° C., and still more preferably 15 to 30° C.

The step (2A) is a step of drying the coating film (x$\beta$'), the coating film (y'), and the coating film (x$\alpha$') formed in the step (1A), simultaneously. The preferred range of the drying temperature in this step is the same as that in the aforementioned step (2). In this step, a resin layer containing the resin part (X) and the particle part (Y) is formed.

Production Method of Second Embodiment

The production method of the second embodiment includes at least the following steps (1B) and (2B).

Step (1B): A step of forming, on a layer (Xβ) mainly containing a resin part (X) that is provided on a substrate or a release material, a coating film (y') formed by a composition (y) containing the aforementioned fine particles in an amount of 15% by mass or more and a coating film (xα') formed by a composition (xα) containing a resin as a main component, as laminated thereon in this order Step (2B): A step of drying the coating film (y') and the coating film (ma') formed in the step (1B) simultaneously.

In the step (1B), the "layer (Xβ) mainly containing a resin part (X)" can be formed by drying the aforementioned coating film (xβ') formed by a composition (xβ) containing a resin as a main component.

The layer (Xβ) is formed of the composition (xβ), and therefore, the layer (Xβ) may contain a crosslinking agent, an ordinary additive, and others in addition to the resin. The content of the resin part (X) in the layer (Xβ) is as described above.

Regarding the formation method of the layer (Xβ), it is possible to form the layer (Xβ) in a manner that a coating film (xβ') formed by a composition (xβ) containing a resin as a main component is formed on a substrate or a release material, and the coating film (xβ') is then dried.

The drying temperature at this time is not particularly limited, and it is preferably 35 to 200° C., more preferably 60 to 180° C., still more preferably 70 to 160° C., and yet still more preferably 80 to 140° C.

This embodiment differs from the aforementioned first embodiment in that the coating film (y') and the coating film (xα') are formed in this order on the layer (Xβ) formed by drying, but not on the coating film (xβ').

In the step (1B), it is also preferred that the aforementioned solvent is blended in the composition (y) and the composition (xα) to form solutions of the respective compositions, and thereafter, the solutions are used for coating.

Regarding the formation method of the coating film (y') and the coating film (xα'), there may be employed a successive formation method of forming a coating film (y') on the layer (Xβ) and then forming a coating film (xα') on the coating film (y'), by using the aforementioned coater, or a simultaneous coating method of coating with both the coating film (y') and the coating film (xα') by using the aforementioned multilayer coater.

In this step (1B), after formation of the coating film (y') or after formation of the coating film (y') and the coating film (xα') and prior to the step (2B), a pre-drying treatment may be carried out in such a degree that the curing reaction of the coating films does not proceed.

In this step (1B), though the drying temperature for the pre-drying treatment is generally so set as to fall within a temperature range in such a degree that curing of the formed coating film does not proceed, it is preferably lower than the drying temperature in the step (2B). A specific drying temperature as prescribed in terms of the "lower than the drying temperature in the step (2B)" is preferably 10 to 45° C., more preferably 10 to 34° C., and still more preferably 15 to 30° C.

The step (2B) is a step of drying the coating film (y') and the coating film (xα') formed in the step (1B) simultaneously, and the preferred range of the drying temperature in this step is the same as in the aforementioned step (2). In this step, a resin layer containing the resin part (X) and the particle part (Y) is formed.

EXAMPLES

The present invention is described more specifically with reference to the following Examples, but it should be construed that the present invention is not limited to the following Examples. The physical property values in the following Production Examples and Examples are values measured by the following methods.

<Mass Average Molecular Weight (Mw)>

The measurement was performed by using a gel permeation chromatography instrument (manufactured by Tosoh Corporation, a product name: "HLC-8020) under the following conditions, and a value measured as the standard polystyrene conversion was used.

(Measurement Condition)

Column: "TSK guard column HXL-L", "TSK gel G2500HXL", "TSK gel G2000HXL", and "TSK gel G1000HXL" (all manufactured by Tosoh Corporation), connected in series Column temperature: 40° C.

Developing solvent: tetrahydrofuran

Flow rate: 1.0 mL/min

<Measurement of Volume Average Secondary Particle Diameter of Silica Particles>

The volume average secondary particle diameter of the silica particles was determined by measuring the particle size distribution with Multisizer III (manufactured by Beckman Coulter Inc.) by the Coulter Counter method.

<Measurement of Thickness of Resin Layer>

The thickness of the resin layer was measured by using a constant pressured thickness measuring instrument, manufactured by TECLOCK Corporation (model number: "PG-02J", standard specification: in conformity with JIS K6783, Z1702, and Z1709)

Specifically, a value obtained by measuring the total thickness of the pressure sensitive adhesive sheet as the measuring object, from which was then subtracted the previously measured thickness of the substrate or release sheet, was defined as the "thickness of resin layer".

Production Examples x-1 to x-4

(Preparation of Solutions (xβ-1) to (xβ-2) and (xα-1) to (xα-2) of Resin Composition)

To the solution of an acrylic resin that is a pressure sensitive adhesive resin, having the kind and the solid content shown in Table 1, a crosslinking agent and a tackifier, each having with the kind and the blending amount shown in Table 1, were added and then diluted with a diluent solvent shown in Table 1, thereby preparing solutions (xβ-1) to (xβ-2) and (xα-1) to (xα-2) of a resin composition each having the solid content shown in Table 1.

The details of the respective components shown in Table 1 used for the preparation of the solutions (xβ-1) to (xβ-2) and (xα-1) to (xα-2) of a resin composition are as follows.

<Solution of Acrylic Resin>

Solution (i): A mixed solution of toluene and ethyl acetate containing an acrylic resin (x-i) (an acrylic copolymer having structural units derived from raw material monomers, BA/AA=90/10 (% by mass), Mw: 630,000) having a solid concentration of 34.0% by mass.

Solution (ii): A mixed solution of toluene and ethyl acetate containing an acrylic resin (x-ii) (an acrylic copolymer having structural units derived from raw material monomers, BA/AA=90/10 (% by mass), Mw: 470,000) having a solid concentration of 37.0% by mass.

Solution (iii): A mixed solution of toluene and isopropyl alcohol (IPA) containing an acrylic resin (x-iii) (an acrylic copolymer having structural units derived from raw material monomers, 2EHA/VAc/AA=75/23/2 (% by mass), Mw: 660,000) having a solid concentration of 37.0% by mass.

Solution (iv): A solution of ethyl acetate containing an acrylic resin (x-iv) (an acrylic copolymer having structural units derived from raw material monomers, BA/AA/HEA=94/3/3 (% by mass), Mw: 1,000,000) having a solid concentration of 37.0% by mass.

The abbreviations of the raw material monomers constituting the aforementioned acrylic copolymers are as follows.

BA: n-Butyl acrylate
2EHA: 2-Ethylhexyl acrylate
AA: Acrylic acid
VAc: Vinyl acetate
HEA: 2-Hydroxyethyl acrylate <Crosslinking Agent>

Al crosslinking agent: Product name "M-5A", manufactured by Soken Chemical & Engineering Co., Ltd., aluminum chelate crosslinking agent, solid concentration: 4.95% by mass Epoxy crosslinking agent: A solution of an epoxy crosslinking agent obtained by diluting "TETRAD-C" (a product name, manufactured by Mitsubishi Gas Chemical Co., Inc.) with toluene to make a solid concentration of 5% by mass <Tackifier>

Rosin ester TF: A rosin ester tackifier, Mw: less than 10,000, softening point: 85° C.

Styrene TF: A styrene tackifier composed of a copolymer of a styrene monomer and an aliphatic monomer, Mw: less than 10,000, softening point: 95° C.

<Diluent Solvent>

Mixed solvent (1): A mixed solvent composed of a mixture of toluene/isopropyl alcohol (IPA)=65/35 (mass ratio)

Mixed solvent (2): A mixed solvent composed of a mixture of ethyl acetate/IPA=86/14 (mass ratio)

TABLE 1

| | Solution of resin composition | | Solution of acrylic resin | | | Crosslinking agent | | | | Tackifier | | | | Diluent Solvent Kind | Solid concentration of solution of resin composition (mass %) |
|---|---|---|---|---|---|---|---|---|---|---|---|---|---|---|---|
| | | Kind | Kind of Resin | Blending amount (parts by mass) | Blending amount of solid (mass %) | Kind | Blending amount (parts by mass) | Blending amount of solid (parts by mass) | Blending amount of solid relative to 100 parts by mass of resin (parts by mass) | Kind | Blending amount of solid (parts by mass) | Total blending amount of solid (parts by mass) | Total blending amount of solid relative to 100 parts by mass of resin (parts by mass) | | |
| Production Example x-1 | (xβ-1) | Solution (i) | Acrylic resin (x-i) [BA/AA = 90/10 (wt %), Mw = 630,000] | 100.0 | 34.0 | Al crosslinking agent | 2.53 | 0.13 | 0.37 | — | — | — | — | Mixed Solvent (1) | 24 |
| | | | | | | Epoxy crosslinking agent | 0.38 | 0.02 | 0.06 | | | | | | |
| Production Example x-2 | (xβ-2) | Solution (ii) | Acrylic resin (x-ii), [BA/AA = 90/10 (wt %), Mw = 470,000] | 50.0 | 18.5 | Al crosslinking agent | 9.00 | 0.45 | 1.20 | — | — | — | — | Mixed Solvent (2) | 30 |
| | | Solution (iii) | Acrylic resin (x-iii) [2EHA/VAc/AA = 75/23/2 (wt %), Mw = 660,000] | 50.0 | 18.5 | | | | | | | | | | |
| Production Example x-3 | (xα-1) | Solution (iv) | Acrylic resin (x-iv), [BA/AA/HEA = 94/3/3 (wt %), Mw = 1,000,000] | 100.0 | 37.0 | Al crosslinking agent | 1.00 | 0.05 | 0.13 | Rosin ester TF | 10.0 | 10.0 | 27.0 | Mixed solvent (2) | 30 |
| | | | | | | Epoxy crosslinking agent | 0.10 | 0.01 | 0.01 | | | | | | |
| Production Example x-4 | (xα-2) | Solution (iv) | Acrylic resin (x-iv), [BA/AA/HEA = 94/3/3 (wt %), Mw = 1,000,000] | 100.0 | 37.0 | Al crosslinking agent | 1.00 | 0.05 | 0.13 | Rosin ester TF | 10.0 | 20.0 | 54.1 | Mixed solvent (2) | 30 |
| | | | | | | Epoxy crosslinking agent | 0.10 | 0.01 | 0.01 | Styrene TF | 10.0 | | | | |

Production Example f-1

(Preparation of Fine Particle Dispersion Liquid (f-1))

To 100 parts by mass (solid content: 34.0 parts by mass) of a mixed solution of toluene and ethyl acetate containing a solution (i) of an acrylic resin containing the aforementioned acrylic resin (x-i) (an acrylic copolymer having structural units derived from butyl acrylate (BA) and acrylic acid (AA), BA/AA=90/10 (% by mass), Mw: 630,000) and having a solid concentration of 34.0% by mass, 51.0 parts by mass (solid content: 51.0 parts by mass) of silica particles (a product name: "Nipsil E-200A", manufactured by Tosoh Silica Corporation, volume average secondary particle diameter: 3 μm) as fine particles and toluene were added, and the fine particles were dispersed, thereby preparing a fine particle dispersion liquid (f-1) having a solid concentration of 27% by mass containing the acrylic resin and the silica particles.

Production Example f-2

(Preparation of Fine Particle Dispersion Liquid (f-2))

In place of the solution (i), to 100 parts by mass (solid content: 37.0 parts by mass) of a mixed solution of toluene and ethyl acetate containing a solution (ii) of an acrylic resin containing the aforementioned acrylic resin (x-ii) (an acrylic copolymer having structural units derived from butyl acrylate (BA) and acrylic acid (AA), BA/AA=90/10 (% by mass), Mw: 470,000) and having a solid concentration of 37.0% by mass, 55.5 parts by mass (solid content: 55.5 parts by mass) of silica particles (a product name: "Nipsil E-200A", manufactured by Tosoh Silica Corporation, volume average secondary particle diameter: 3 μm) as fine particles and toluene were added, and the fine particles were dispersed, thereby preparing a fine particle dispersion liquid (f-2) having a solid concentration of 30% by mass containing the acrylic resin and the silica particles.

Production Examples y-1 to y-2

(Preparation of Coating Liquids (y-1) to (y-2) for Forming Coating Film (y'))

A fine particle dispersion liquid, a solution of an acrylic resin, a crosslinking agent, and a diluent solvent, each having the kind and blending amount shown in Table 2, were added, thereby preparing each of coating liquids (y-1) to (y-2) for forming a coating film (y') having a solid concentration shown in Table 2.

The details of the respective components shown in Table 2 used for the preparation of the coating liquids (y-1) to (y-2) for forming a coating film (y') are as follows.

<Fine Particle Dispersion Liquid>

Dispersion liquid (f-1): A fine particle dispersion liquid (f-1) containing the acrylic resin (x-i) and the silica particles and having a solid concentration of 27% by mass, as prepared in Production Example f-1.

Dispersion liquid (f-2): A fine particle dispersion liquid (f-2) containing the acrylic resin (x-ii) and the silica particles and having a solid concentration of 30% by mass, as prepared in Production Example f-2.

<Solution of Acrylic Resin>

Solution (i): A mixed solution of toluene and ethyl acetate containing an acrylic resin (x-i) (an acrylic copolymer having structural units derived from raw material monomers, BA/AA=90/10 (% by mass), Mw: 630,000) having a solid concentration of 34.0% by mass.

Solution (ii): A mixed solution of toluene and ethyl acetate containing an acrylic resin (x-ii) (an acrylic copolymer having structural units derived from raw material monomers, BA/AA=90/10 (% by mass), Mw: 470,000) having a solid concentration of 37.0% by mass.

<Crosslinking Agent>

Al crosslinking agent: Product name "M-5A", manufactured by Soken Chemical & Engineering Co., Ltd., aluminum chelate crosslinking agent, solid concentration: 4.95% by mass Epoxy crosslinking agent: A solution of an epoxy crosslinking agent obtained by diluting "TETRAD-C" (a product name, manufactured by Mitsubishi Gas Chemical Co., Inc.) with toluene to make a solid concentration of 5% by mass <Diluent Solvent>

IPA/CHN: A mixed solvent of isopropyl alcohol (IPA) and cyclohexanone (CHN) (IPA/CHN=95/5 (mass ratio))

TABLE 2

| | Coating liquid for forming coating film (y') | Fine particle dispersion liquid | | | Solution of Acrylic resin | | | |
|---|---|---|---|---|---|---|---|---|
| | | Kind | Blending amount (parts by mass) | Blending amount of solid (parts by mass) | Content (*) of fine particles (parts by mass) | Kind | Kind of Resin | Blending amount (parts by mass) | Blending amount of solid (parts by mass) |
| Production Example y-1 | (y-1) | Dispersion liquid (f-1) | 73.1 | 19.7 | 11.8 | Solution (i) | Acrylic resin (x-i) [BA/AA = 90/10 (wt %), Mw = 630,000] | 26.9 | 9.1 |
| Production Example y-2 | (y-2) | Dispersion liquid (f-2) | 69.7 | 20.9 | 12.5 | Solution (ii) | Acrylic resin (x-ii) [BA/AA = 90/10 (wt %), Mw = 470,000] | 18.5 | 6.8 |

TABLE 2-continued

| Coating liquid for forming coating film (y') | Crosslinking agent | | | Diluent Solvent Kind | Solid concentration of coating liquid (mass %) | Concentration (**) of fine particles in solid of coating solution (mass %) |
| | Kind | Blending amount (parts by mass) | Blending amount of solid (parts by mass) | Blending amount of solid relative to 100 parts by mass of resin (parts by mass) | | | |
|---|---|---|---|---|---|---|---|
| Production Example y-1 | (y-1) | Al crosslinking agent | 2.67 | 0.13 | 0.78 | IPA/CHN | 24 | 41 |
| | | Epoxy crosslinking agent | 0.40 | 0.02 | 0.12 | | | |
| Production Example y-2 | (y-2) | Al crosslinking agent | 5.25 | 0.26 | 1.71 | IPA/CHN | 24 | 45 |

(*) Content of fine particles in fine particle dispersion liquid: (y-1) is concerned with a value calculated from {[blending amount of solid] × 51.0/(34.0 + 51.0)}; and (y-2) is concerned with a value calculated from {[blending amount of solid] × 55.5/(37.0 + 55.5)}. (**) Concentration of fine particles in solid of coating solution: A value calculated from {[content of fine particles]/([blending amount of solid in fine particles dispersion liquid] + [blending amount of solid in acrylic resin] + [blending amount of solid of crosslinking agent]) × 100}.

Examples 1 to 2

(1) Formation of Coating Film

On a release agent layer of a release film (manufactured by Lintec Corporation, a product name: "SP-PET381031", thickness: 38 μm, a PET film having a silicone release agent layer provided on one surface thereof) that is a first release material, the solution (xβ-1) of the resin composition prepared in Production Example x-1, the coating liquid (y-1) for forming the coating film (y') prepared in Production Example y-1, and the solution (xβ-1) of the resin composition for forming the coating film (xα') prepared in Production Example x-1 were simultaneously coated in this order from the upper portion of the release agent layer with a multilayer the coater (width: 250 mm), thereby simultaneously forming a coating film (xβ'), a coating film (y'), and a coating film (xα') in this order.

The coating speed of each of the solutions (coating liquids) for forming the coating film (xβ'), the coating film (y'), and the coating film (xα') and the coating amount of each of the coating films are shown in Table 3.

(2) Drying Treatment

The three layers of the coating film (xβ'), the coating film (y'), and the coating film (xα') were simultaneously dried at a drying temperature of 100° C. for 2 minutes, thereby forming a resin layer containing a resin part (X) and a particle part (Y) having the thickness shown in Table 3.

In all of Examples 1 to 2, plural concave portions and flat faces were also confirmed on the surface (α) of the formed resin layer through visual inspection.

(3) Production of Pressure Sensitive Adhesive Sheet without Substrate and Pressure Sensitive Adhesive Sheet with Substrate Lamination was performed in such a manner that the surface (α) of the formed resin layer was attached to a surface of a release agent layer of a release film (manufactured by Lintec Corporation, a product name: "SP-PET386040") that is a second release material, thereby producing a pressure sensitive adhesive sheet without a substrate.

After allowing the aforementioned pressure sensitive adhesive sheet without a substrate as similarly produced to stand under an environment at 23° C. for one week, the first release material was removed, and lamination was performed in such a manner that the exposed surface (β) of the resin layer was attached to a polyethylene terephthalate (PET) film (manufactured by Toray Industries, Inc., a product name: "Lumirror T60 #50", thickness: 50 μm) that is a substrate, thereby producing a pressure sensitive adhesive sheet with a substrate.

Examples 3 to 4

(1) Formation of Coating Film

On a surface of a polyethylene terephthalate (PET) film having an aluminum vapor deposition layer on one surface thereof (manufactured by Lintec Corporation, a product name: "FNS MAT N50", thickness: 50 μm), the solution (xβ-2) of the resin composition prepared in Production Example x-2, the coating liquid (y-2) for forming the coating film (y') prepared in Production Example y-2, and the solution (xα-1) or (xα-2) of the resin composition prepared in Production Example x-3 or x-4 were simultaneously coated in this order from the upper portion of the aluminum vapor deposition layer with a multilayer die coater (width: 250 mm), thereby simultaneously forming a coating film (xβ'), a coating film (y'), and a coating film (xα') in this order.

The coating speed of each of the solutions (coating liquids) for forming the coating film (xβ'), the coating film (y'), and the coating film (xα') and the coating amount of each of the coating films are shown in Table 3.

(2) Drying Treatment

The three layers of the coating film (xβ'), the coating film (y'), and the coating film (xα') were simultaneously dried at a drying temperature of 100° C. for 2 minutes, thereby forming a resin layer containing a resin part (X) and a particle part (Y) having the thickness shown in Table 3.

In all of Examples 3 to 4, plural concave portions and flat faces were also confirmed on the surface (α) of the formed resin layer through visual inspection.

(3) Production of Pressure Sensitive Adhesive Sheet with Substrate

Lamination was performed in such a manner that the surface (α) of the formed resin layer was attached to a surface of a release agent layer of a release film (manufactured by Lintec Corporation, a product name: "SP-PET381031"), thereby producing a pressure sensitive adhesive sheet with a substrate.

|  | Coating speed (m/min) | Coating amount of coating film (g/m²) | | | Coating film (xβ') Kind of solution | Kind of coating liquid | Coating film (y') Concentration of fine particles in coating film (y') (mass %) | Coating film (xα') Kind of solution | Thickness of resin layer (μm) |
|---|---|---|---|---|---|---|---|---|---|
|  |  | Coating film (xβ') | Coating film (y') | Coating film (xα') |  |  |  |  |  |
| Example 1 | 5.0 | 43.7 | 35.0 | 55.0 | (xβ-1) | (y-1) | 41 | (xβ-1) | 32 |
| Example 2 | 5.0 | 54.2 | 5.0 | 55.0 | (xβ-1) | (y-1) | 41 | (xβ-1) | 38 |
| Example 3 | 5.0 | 26.7 | 5.0 | 52.0 | (xβ-2) | (y-2) | 45 | (xα-1) | 34 |
| Example 4 | 5.0 | 27.0 | 48.2 | 56.2 | (xβ-2) | (y-2) | 45 | (xα-2) | 35 |

Comparative Examples 1 to 4

(1) Production of Embossed Release Paper

On one surface of a wood-free paper, a 25 μm-thick resin film made of a low-density polyethylene resin (manufactured by Sumitomo Chemical Co., Ltd., a product name: "SUMIKATHENE (L705)", melting point: 106° C.) was formed. A relief formed face of a metal engraved plate was brought into intimate contact with the surface of the resin film and inserted in that state between two rotating silicon rubber rollers heated at 115° C., thereby subjecting the surface of the resin layer to emboss processing.

On the surface of the resin layer after the emboss processing, a silicone release agent (manufactured by Lintec Corporation, the same release agent as a product name: "SP-PET1031") and then dried at 100° C. for 1 minute, thereby producing a 110 μm-thick embossed release paper.

As the relief formed face of the metal engraved plate, those processed such that respective concave portions and flat faces were formed on the surface (α) of the resin layer of the pressure sensitive adhesive sheet produced in each of Comparative Examples 1 to 4 were used.

(2) Production of Pressure Sensitive Adhesive Sheet with Substrate

On the release agent layer of the embossed release paper produced in the above (1), the solution (xβ-1) of the resin composition prepared in Production Example x-1 as shown in Table 1 was coated with an applicator and then dried at 100° C. for 1 minute, thereby forming a resin layer so as to have the coating speed and the coating amount of each coating film as described in Example in Table 3.

Then, lamination was performed in such a manner that surface (α) of the resin layer was attached to a PET film (manufactured by Toray Industries, Inc., a product name: "Lumirror T60 #50", thickness: 50 μm), thereby producing a pressure sensitive adhesive sheet with a substrate.

Using the pressure sensitive adhesive sheet without a substrate or the pressure sensitive adhesive sheet with a substrate produced in each of the Examples and Comparative Examples, characteristics of the resin layer which the pressure sensitive adhesive sheet had and the pressure sensitive adhesive sheet were measured or observed by the following methods. The results are shown in Table 4.

(1) Production of Measurement Sample

As shown in FIG. 5(a), in order to exclude any influence, such as undulations of the pressure sensitive adhesive sheet, etc., a no-alkali glass (a product name: "EAGLE XG", manufactured by Corning Incorporated) that is an adherend 101 having a smooth face and the substrate of the pressure sensitive adhesive sheet produced in each of the Examples and Comparative Examples were attached to each other via a double-sided pressure sensitive adhesive tape.

Then, the release material laminated on the surface (α) of the resin layer of the pressure sensitive adhesive sheet was removed, and the resultant in which the surface (α) of the resin layer was exposed was used as the measurement sample.

(2) Acquirement of Image of Region (Dc) on Surface (a)

The exposed surface (α) of the resin layer of the aforementioned measurement sample was photographed regarding arbitrarily selected regions adjoining each other on the surface (α) with a digital microscope (magnification: 50 times) from the A direction of FIG. 5(a), to acquire a connected image in which neighboring plural images were connected using an image connecting function of the digital microscope.

More specifically, in photographing, a focus was successively moved from the upper portion of a site which was considered to be a flat face through visual inspection from the A direction of FIG. 5(a), and any portion which was first in focus was photographed as the flat face.

In the acquired connected image, a region (Dc) surrounded by a circle having a diameter of 8 mm was arbitrarily selected, and this was defined as an "image of region (Dc)".

The photographing conditions with the digital microscope in the above (2) are as follows.

(Measuring Instrument)

A product name "Digital Microscope VHX-5000", manufactured by Keyence Corporation, High-resolution Zoom Lens VHX-ZST (100×)

(Measurement Conditions)

Epi-illumination: ON
Stage transmitted illumination: OFF
Switching of illumination: Coaxial epi-illumination
Edge enhancement: OFF (3) Measurement of Areas of Concave Portions and Flat Faces Existing in Region (Dc)

Automatic area measurement was performed with the same digital microscope as described above on the basis of the "image of region (Dc)" as acquired in the above (2), thereby obtaining areas of each concave portion and each flat face existing in the region (Dc), respectively.

In the automatic area measurement, the flat faces and the concave portions existing in the region (Dc) were binarized with a digital microscope and if desired, image processing through visual inspection, and measurement of numerical values (areas) of the resulting binarized images was then performed, thereby measuring areas of each concave portion and each flat face. In the case where plural concave portions and plural flat faces existed, the areas of the respective concave portions and flat faces were measured.

The conditions of the automatic area measurement are as follows.

(Automatic Area Measurement Conditions)

Extraction mode: Illuminance (noise removal: weak)

Extraction region: To extract a circle having a diameter of 8 mm by numerical value designation (rectangle)

Shaping of extraction region: Particle removal (removal of an area of 100 µm$^2$ or less)

In the case where whether or not the flat face existed could not be judged through visual inspection of the image, a translucent adherend having a smooth surface was manually attached on the surface ($\alpha$) of the resin layer by using a squeegee without applying a load as far as possible, an interface between the smooth surface 100$a$ of the translucent adherend 100 and the surface ($\alpha$) 12$a$ of the resin layer 12 was photographed from the W direction in FIG. 5($b$), and in the surface ($\alpha$) 12$a$, any portion attached to the smooth surface 100$a$ was judged as the flat face.

Similar to the "adherend having a smooth surface", a no-alkali glass (a product name: "EAGLE XG", manufactured by Corning Incorporated) was used for the translucent adherend 100 having the smooth surface 100$a$.

Various measured values (e.g., an average value, a standard deviation, a maximum value, a minimum value, etc.) were calculated from data regarding the area of each concave portion and the area of each flat face existing in the resulting region (Dc) by using a graph software (Excel, available from Microsoft Japan Co., Ltd.).

<Whether or not Concave Portion and Flat Face can be Confirmed Through Visual Inspection>

The exposed surface ($\alpha$) of the resin layer of the measurement sample produced in the above (1) was observed through visual inspection, and whether or not the existence of the concave portion and flat face on the surface ($\alpha$) could be confirmed through visual inspection was evaluated according to the following criteria.

A: The existence of the concave portion and flat face on the surface ($\alpha$) can be confirmed through visual inspection.

F: The existence of the concave portion and flat face on the surface ($\alpha$) cannot be confirmed through visual inspection.

<Evaluation Regarding Shapes of Concave Portion and Flat Face>

Evaluation Item (a):

The "image of the region (Dc)" acquired in the above (2) was observed, and the presence or absence of the existence of the concave portion and the plural flat faces having an irregular shape was observed and evaluated according to the following criteria. The results of the evaluation are shown in Table 4.

A: In the region (Dc), the existence of the concave portion and the plural flat faces having an irregular shape was confirmed.

B: In the region (Dc), though the existence of the concave portion and the plural flat faces was confirmed, all of the confirmed flat faces were regular, and the existence of an irregular flat face could not be confirmed.

C: In the region (Dc), the existence of the concave portion and the irregular shape could not be confirmed.

In the aforementioned evaluation item (a), the observation regarding the following evaluation items (b1) to (b3) and (c1) to (c3) was performed, and the evaluation according to the respective criteria was performed. The results of these evaluations are shown in Table 4.

(Evaluation Items Regarding Shape and Position of Flat Faces Existing in Region (Dc))

Evaluation Item (b1):

From the acquired "image of the region (Dc)", whether or not a flat face having an area such that a region surrounded by a circle having a diameter of at least 100 µm is selectable exists in the region (Dc) was evaluated according to the following criteria.

A+: A flat face having an area such that a region surrounded by a circle having a diameter of 200 µm is selectable exists in the region (Dc).

A: A flat face having an area such that a region surrounded by a circle having a diameter of 150 µm is selectable exists in the region (Dc).

B: A flat face having an area such that a region surrounded by a circle having a diameter of 100 µm is selectable exists in the region (Dc).

C: A flat face having an area such that a region surrounded by a circle having a diameter of 100 µm is selectable does not exist in the region (Dc).

Evaluation Item (b2):

From the acquired "image of the region (Dc)", whether or not the position at which the plural flat faces of the region (Dc) exist has periodicity was evaluated according to the following criteria.

A: The position at which the plural flat faces exists does not have periodicity.

F: The position at which the plural flat faces exists has periodicity, or the plural flat faces do not exist in the region (Dc).

Evaluation Item (b3):

From the acquired "image of the region (Dc)", whether or not the shape of the flat face existing in the region (Dc) has a shape so as to have a fixed repeating unit was evaluated according to the following criteria.

A: The shape of the flat face does not have a shape so as to have a fixed repeating unit.

F: The shape of the flat face has a shape so as to have a fixed repeating unit.

(Evaluation Items Regarding Shape and Position of Concave Portion Existing in Region (Dc)>

Evaluation Item (c1):

From the acquired "image of the region (Dc)", whether or not the irregular concave portion exists in the region (Dc) was evaluated according to the following criteria.

A: Plural irregular concave portions exist.

B: Only one irregular concave portion exists.

C: An irregular concave portion does not exist.

Evaluation Item (c2):

From the acquired "image of the region (Dc)", whether or not the plural concave portions exist, and the position at which the plural concave portions exist has periodicity was evaluated according to the following criteria.

A: The position at which the plural concave portions exist does not have periodicity.

F: The position at which the plural concave portions exist has periodicity, or the plural concave portions do not exist in the region (Dc).

Evaluation Item (c3):

From the acquired "image of the region (Dc)", whether or not, the shape of the concave portion existing in the region (Dc) has a shape so as to have a fixed repeating unit was evaluated according to the following criteria.

A: The shape of the concave portion does not have a shape so as to have a fixed repeating unit.

F: The shape of the concave portion has a shape so as to have a fixed repeating unit.

<Occupying Area Ratio of Flat Face or Concave Portion>

The "occupying area ratio (%) of the flat face" and the "occupying area ratio (%) of the concave portion" relative to the whole area of the region (Dc) were calculated on the basis of data of the area of each concave portion and the area of each flat face as acquired in the above (3). The results of the evaluation are shown in Table 4.

Calculation or evaluation of physical property values regarding the following evaluation items (d1) to (d2) and (e1) to (e2) was also performed. The results of these evaluations are shown in Table 4.

<Evaluation Regarding Areas of Flat Face and Concave Portion Existing in Region (Dc)>

Evaluation Item (d1):

Whether or not a flat face having an area of 0.2 mm$^2$ or more exists in the region (Dc) was evaluated according to the following criteria A+: Plural flat faces having an area of 0.4 mm$^2$ or more exist.

A: One flat face having an area of 0.4 mm$^2$ or more exists, and separately, plural flat faces having an area of 0.2 mm$^2$ or more and less than 0.4 mm$^2$ exist.

B+: Plural flat faces having an area of 0.2 mm$^2$ or more and less than 0.4 mm$^2$ exist.

B: One flat face having an area of 0.2 mm$^2$ or more and less than 0.4 mm$^2$ exists.

C: A maximum value of the area of the flat face existing in the region (Dc) is less than 0.2 mm$^2$.

Evaluation Item (d2):

An occupying area ratio of the irregular flat face existing in the region (Dc) relative to the whole area of the flat faces existing in the region (Dc) was calculated and evaluated according to the following criteria.

A+: The occupying area ratio of the irregular flat face is 100%.

A: The occupying area ratio of the irregular flat face is 90% or more and less than 100%.

B: The occupying area ratio of the irregular flat face is 80% or more and less than 90%.

C: The occupying area ratio of the irregular flat face is less than 80%.

Evaluation Item (e1)

An occupying area ratio of the concave portion having a maximum area within the region (Dc) relative to the whole area of the concave portion existing in the region (Dc) was calculated according to the following expression.

[Occupying area ratio (%) of concave portion having a maximum area within the region(Dc)]=[Area of concave portion having a maximum area]/[Whole area of concave portion]×100

Evaluation Item (e2):

An occupying area ratio of the irregular concave portion existing in the region (Dc) relative to the whole area of the concave portion existing in the region (Dc) was calculated and evaluated according to the following criteria.

A+: The occupying area ratio of the irregular concave portion is 100%.

A: The occupying area ratio of the irregular concave portion is 90% or more and less than 100%.

B: The occupying area ratio of the irregular concave portion is 80% or more and less than 90%.

C: The occupying area ratio of the irregular concave portion is less than 80%.

(4) Measurement and Calculation of Physical Property Values Regarding Flat Faces (S) Existing in Region (Dc)

<Calculation of $r_{MAX}$ Value of Flat Faces (S)>

One or more flat faces (S) excluding flat faces having a cumulative relative frequency of 30% or less determined by adding the relative frequency from the respective flat faces with a smaller area were extracted on the basis of data of the area of each flat face existing in the region (Dc) measured in the above (3).

On the assumption of placing the region (Dc) containing the extracted flat faces (S) on an orthogonal coordinate system in which a direction orthogonal to the horizontal Feret's diameter direction is the vertical Feret's diameter direction, the following operations (i) to (iii) were performed.

Operation (i):

With respect to each of the flat faces (S) contained in the region (Dc), an area of a circumscribed rectangle of the flat face (S) which circumscribes the flat face (S) by two pairs of straight lines parallel to the horizontal Feret's axis and the vertical Feret's axis was calculated by automatic measurement with the aforementioned digital microscope on the basis of the "image of the region (Dc)" acquired in the above (2).

A ratio of [{area of flat face (S)}/{area of circumscribed rectangle of flat face (S)}] was calculated for every flat face (S), and an average value of the obtained ratios was calculated and defined as r(0°).

Operation (ii):

With respect to each of all of the flat faces (S) in each region obtained by rotating the region (Dc) at θ (θ=15°, 30°, 45°, 60°, 75°, or 90°) in the counterclockwise direction centering on, as a center of the rotation, the center of the circle of the region (Dc) used in the operation (i) in the orthogonal coordinate system, an area of a circumscribed rectangle of each flat face (S) when rotated at θ in the same procedures as in the operation (i) was calculated by automatic measurement with the aforementioned digital microscope.

Similar to the operation (i), a ratio of [{area of flat face (S)}/{area of circumscribed rectangle of flat face (S)}] was calculated for every flat face (S), and r(θ) that is an average value of the obtained ratios was calculated with respect to every case at θ=15°, 30°, 45°, 60°, 75°, and 90°.

Operation (iii):

A maximum value of the seven values of r(θ) (θ=0°, 15°, 30°, 45°, 60°, 75°, and 90°) as calculated in the operations (i) and was defined as the $r_{MAX}$ value of the flat faces (S). The calculated $r_{MAX}$ values of the flat faces (S) are shown in Table 4.

<Skewness Sk Value Regarding Flat Faces (S)>

One or more flat faces (S) excluding flat faces having a cumulative relative frequency of 30% or less determined by adding the relative frequency from the respective flat faces with a smaller area were extracted on the basis of data of the area of each flat face existing in the region (Dc) measured in the above (3).

With respect to the area of each of the extracted flat faces (S), the skewness Sk value relative to a normal distribution curve between the area and the frequency of each of the flat faces (S) was calculated on the basis of the following expression (2) by using a graph software (Excel, available from Microsoft Japan Co., Ltd.).

$$Sk = \frac{n}{(n-1)(n-2)} \sum_{i=1}^{n} \frac{(x_i - \mu)^3}{s^3} \qquad (2)$$

In the expression (2), n represents the number of flat faces (S); $x_i$ represents an area of each of flat faces (S) 1, 2, . . . n); μ represents an average value of areas of respective flat faces (S); and s represents a sample standard deviation.

<Kurtosis Ku Value Regarding Flat Faces (S)>

One or more flat faces (S) excluding flat faces having a cumulative relative frequency of 30% or less determined by adding the relative frequency from the respective flat faces with a smaller area were extracted on the basis of the value of the area of each of the plural flat faces existing in the region (Dc) measured in the above (3).

With respect to the area of each of the extracted flat faces (S), the kurtosis Ku value relative to a normal distribution curve between the area and the frequency of each of the flat faces (S) was calculated on the basis of the following expression (3) by using a graph software (Excel, available from Microsoft Japan Co., Ltd.).

$$Ku = \frac{n(n+1)}{(n-1)(n-2)(n-3)} \sum_{i=1}^{n} \frac{(x_i - \mu)^4}{s^4} - \frac{3(n-1)^2}{(n-2)(n-3)} \qquad (3)$$

In the expression (3), n represents the number of flat faces (S); $x_i$ represents an area of each of flat faces (S) 1, 2, . . . n); μ represents an average value of areas of respective flat faces (S); and s represents a sample standard deviation.

<Whether or Not Concave Portion Having Maximum Height Difference of 0.5 μm or More Exists in Region (Dc)>

In a cross section of the region (Dc) of the pressure sensitive adhesive sheet with a substrate produced in each of the Examples and Comparative Examples obtained by cutting by a plane vertical to the region (Dc) surrounded by a circle having a diameter of 8 mm that is arbitrarily selected on the surface (α) of the resin layer thereof, a height difference of each existing concave portion was observed with a scanning electron microscope (manufactured by Hitachi, Ltd., a product name: "S-4700", magnification: 500 times), thereby acquiring a cross section image.

In this cross section image, whether or not any concave portion having a maximum height difference of 0.5 μm or more exists on the side of the surface (α) 12a was evaluated according to the following criteria.

A: The concave portion having a maximum height difference of 0.5 μm or more exists.

F: The concave portion having a maximum height difference of 0.5 μm or more does not exist.

<Mass Retention Rate of Resin Layer of Pressure Sensitive Adhesive Sheet>

After a sole resin layer was obtained from the pressure sensitive adhesive sheet, the mass of the resin layer before heating was measured. The resin layer was then heated to 800° C. for 30 minutes in a muffle furnace (manufactured by Denken Co., Ltd., a product name: "KDF-P90"). The resin layer after heating was measured for the mass thereof, and the mass retention rate of the resin layer was calculated according to the following expression. The values are shown in Table 4.

Mass retention rate of resin layer (%)=(Mass of resin layer after heating)/(Mass of resin layer before heating)×100

<Air Escape Property>

The pressure sensitive adhesive sheet with a substrate in a size of 50 mm in length and 50 mm in width was attached to a melamine-coated plate as an adherend in a manner forming air accumulation, and two types of samples of the case of strongly press-attaching the surroundings of the air accumulation with a squeegee and the case of weakly press-attaching the surroundings of the air accumulation with a squeegee were produced. After attaching for removing the air accumulation with the squeegee along various directions, the presence or absence of the air accumulation was observed, and the air escape property of each of the pressure sensitive adhesive sheets was evaluated according to the following criteria. The evaluation results are shown in Table 4.

5: In all of the case of weakly attaching and the case of strongly attaching, the air accumulation disappears in performing attaching along any direction.

4: In the case of weakly attaching, the air accumulation disappears in performing attaching along any direction. In the case of strongly attaching, in attaching along substantially all directions, the majority of the air accumulation disappears, and when again attached, the air accumulation remained in attaching along a part of the direction disappears.

3: In the case of weakly attaching, the air accumulation disappears in performing attaching along any direction. On the other hand, in the case of strongly attaching, a site where the air accumulation remained in attaching along a part of the direction remains exists.

2: In the case of weakly attaching, in attaching along substantially all directions, the majority of the air accumulation disappears, and when again attached, the air accumulation remained in attaching along a part of the direction disappears. On the other hand, in the case of strongly attaching, the air accumulation remains in attaching along a part of the direction.

1: In all of the case of weakly attaching and the case of strongly attaching, the air accumulation remains in attaching along a part of the direction.

<Pressure Sensitive Adhesive Strength>

The pressure sensitive adhesive sheet with a substrate produced in each of the Examples and Comparative Examples was cut into a size of 25 mm in length and 300 mm in width, and the surface (α) of the resin layer of the pressure sensitive adhesive sheet was attached to a stainless steel plate (SUS304, polished with #360 polishing paper) under an environment of 23° C. and 50% RH (relative humidity), followed by allowing to stand in the same environment for 24 hours. After standing, the pressure sensitive adhesive strength of each of the pressure sensitive adhesive sheets was measured according to JIS Z0237:2000 by the 180° peeling method at a peeling speed of 300 mm/min. The measurement results are shown in Table 4.

<Blister Resistance>

The pressure sensitive adhesive sheet with a substrate in a size of 50 mm in length and 50 mm in width was attached to a polymethyl methacrylate plate having a size of 70 mm in length, 150 mm in width, and 2 mm in thickness (manufactured by Mitsubishi Rayon Co., Ltd., a product name: "ACRYLITE L001"), followed by press-attaching with a squeegee, thereby producing a test sample.

The test sample was allowed to stand at 23° C. for 12 hours, then allowed to stand in a hot air dryer at 80° C. for 1.5 hours, further allowed to stand in a hot air dryer at 90° C. for 1.5 hours, and then confirmed for the occurrence state of blister after the heat acceleration through visual inspection, and the blister resistance of each of the pressure sensitive adhesive sheets was evaluated according to the following criteria. The evaluation results are shown in Table 4.

A: Completely no blister was observed.
B: Blister was partially observed.
C: Blister was observed over the surface.

Namely, the circle of the image of each of FIG. 6(a) and FIGS. 7 to 13 is corresponding to the circle having a diameter of 8 mm in the region (Dc).

In addition, in these binarized images, the black parts are corresponding to a flat face, and the white parts are corresponding to the concave portion.

Figure 6:
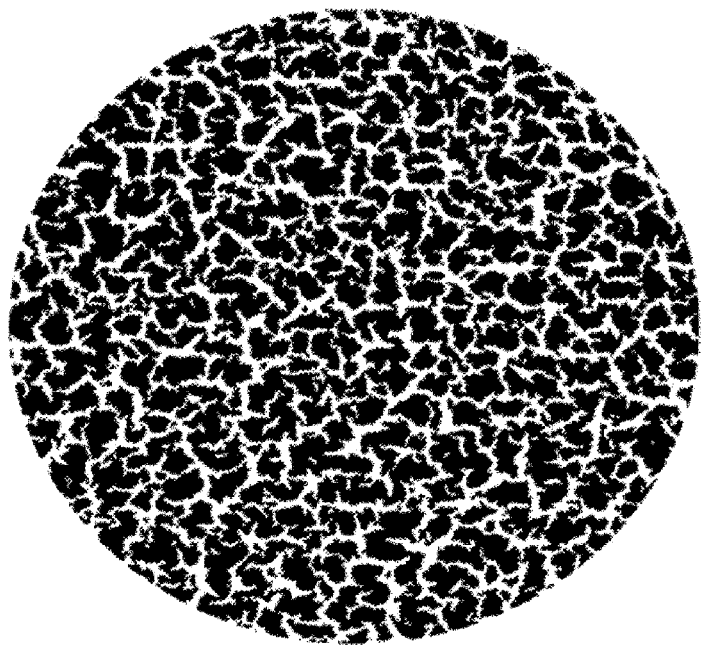
FIG. 6(a) is a binarized image resulting from binarization of an image obtained by photographing the region (Dc) surrounded by a circle having a diameter of 8 mm that is arbitrarily selected on the exposed surface (α) of the resin layer of the pressure sensitive adhesive sheet produced in Example 1, from the side of the surface (α) with a digital microscope. Black parts of the binarized image are corresponding to a flat face, and white parts thereof are corresponding to the concave portion.
FIG. 6(b) is a cross section image acquired by observing a cross section of the pressure sensitive adhesive sheet produced in Example 1 with a scanning microscope.
Figure 6:
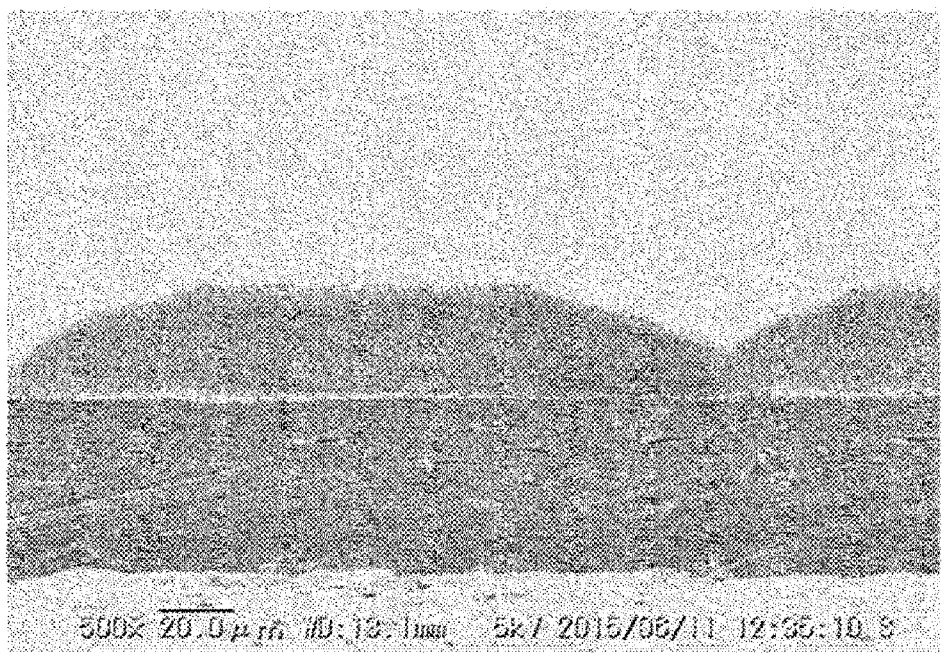
Figure 7:
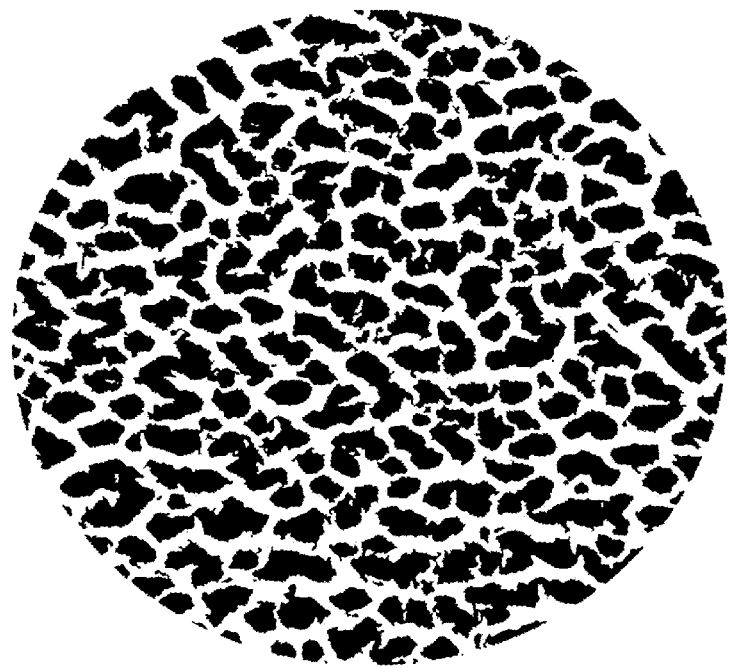
FIG. 7 is a binarized image resulting from binarization of an image obtained by photographing the region (Dc) surrounded by a circle having a diameter of 8 mm that is arbitrarily selected on the exposed surface (α) of the resin layer of the pressure sensitive adhesive sheet produced in Example 2, from the side of the surface (α) with a digital microscope. Black parts of the binarized image are corresponding to a flat face, and white parts thereof are corresponding to the concave portion.
Figure 8:
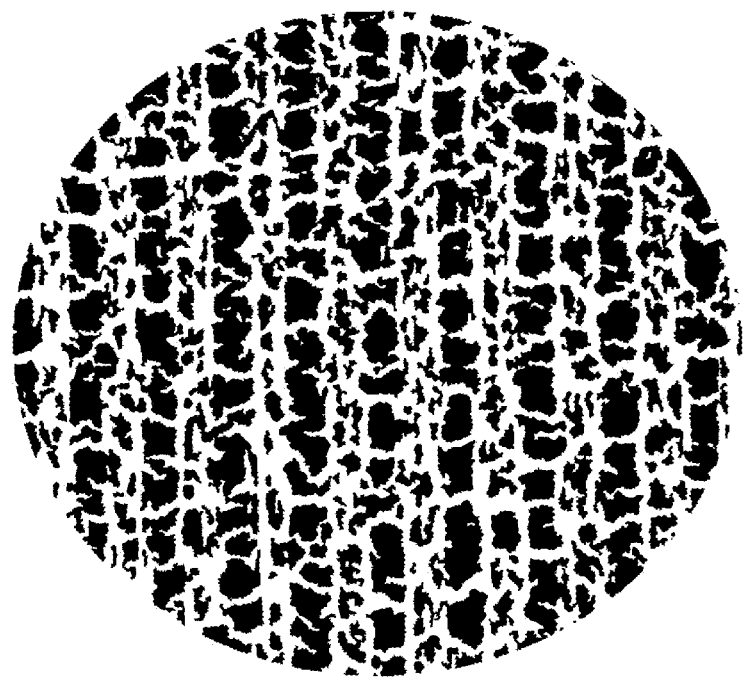
FIG. 8 is a binarized image resulting from binarization of an image obtained by photographing the region (Dc) surrounded by a circle having a diameter of 8 mm that is arbitrarily selected on the exposed surface (α) of the resin layer of the pressure sensitive adhesive sheet produced in Example 3, from the side of the surface (α) with a digital microscope. Black parts of the binarized image are corresponding to a flat face, and white parts thereof are corresponding to the concave portion.
Figure 9:
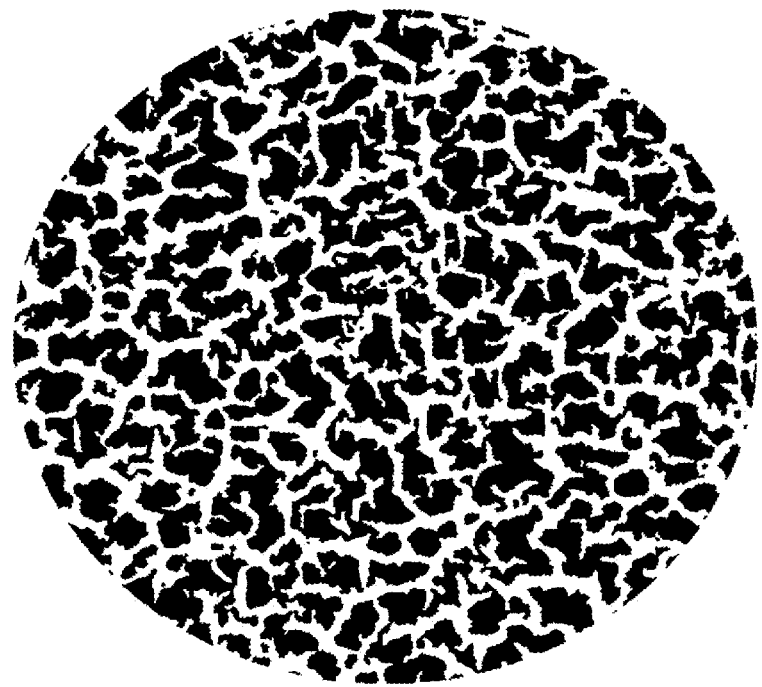
FIG. 9 is a binarized image resulting from binarization of an image obtained by photographing the region (Dc) surrounded by a circle having a diameter of 8 mm that is arbitrarily selected on the exposed surface (α) of the resin layer of the pressure sensitive adhesive sheet produced in Example 4, from the side of the surface (α) with a digital microscope. Black parts of the binarized image are corresponding to a flat face, and white parts thereof are corresponding to the concave portion.
Figure 10:
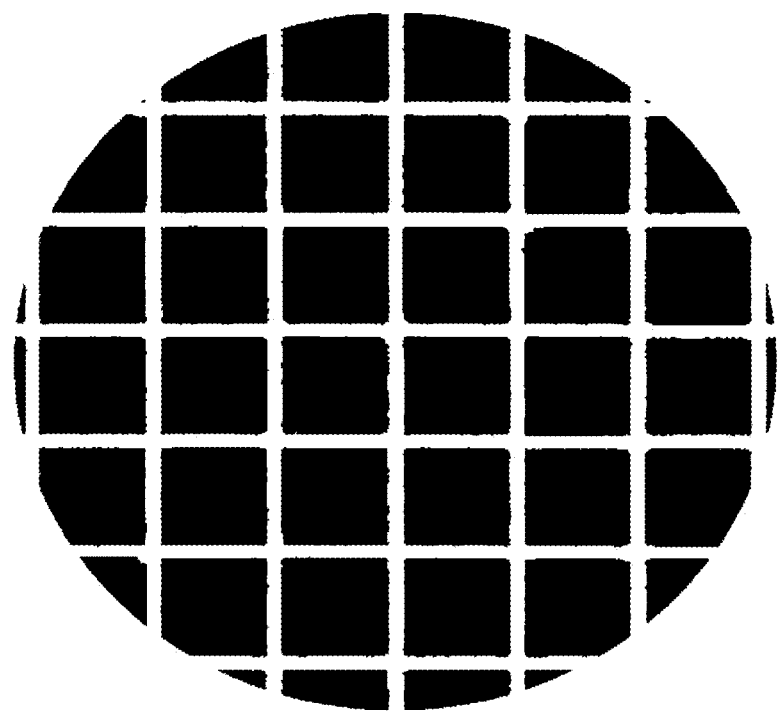
FIG. 10 is a binarized image resulting from binarization of an image obtained by photographing the region (Dc) surrounded by a circle having a diameter of 8 mm that is arbitrarily selected on the exposed surface (α) of the resin layer of the pressure sensitive adhesive sheet produced in Comparative Example 1, from the side of the surface (α) with a digital microscope. Black parts of the binarized image are corresponding to a flat face, and white parts thereof are corresponding to the concave portion.
Figure 11:
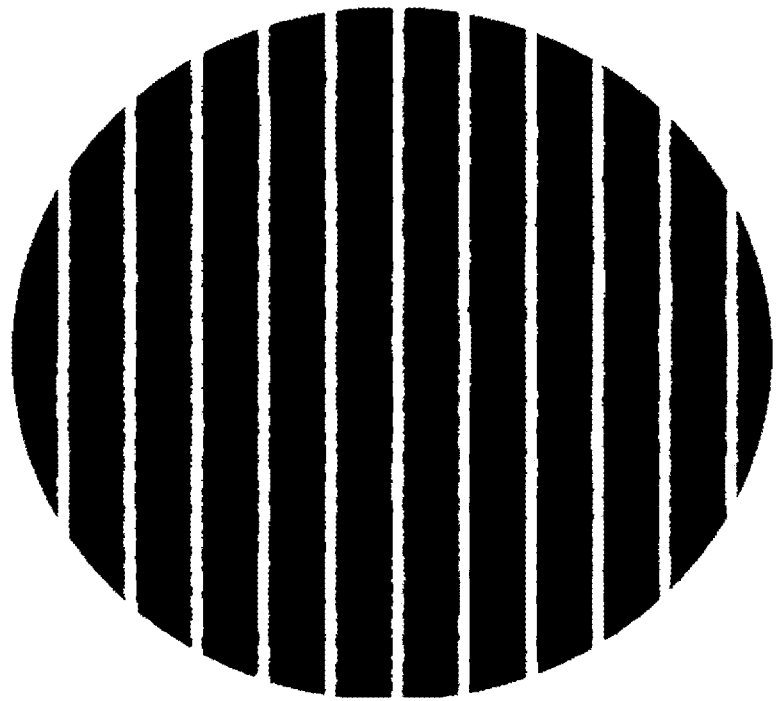
FIG. 11 is a binarized image resulting from binarization of an image obtained by photographing the region (Dc) surrounded by a circle having a diameter of 8 mm that is arbitrarily selected on the exposed surface (α) of the resin layer of the pressure sensitive adhesive sheet produced in Comparative Example 2, from the side of the surface (α) with a digital microscope. Black parts of the binarized image are corresponding to a flat face, and white parts thereof are corresponding to the concave portion.
Figure 12:
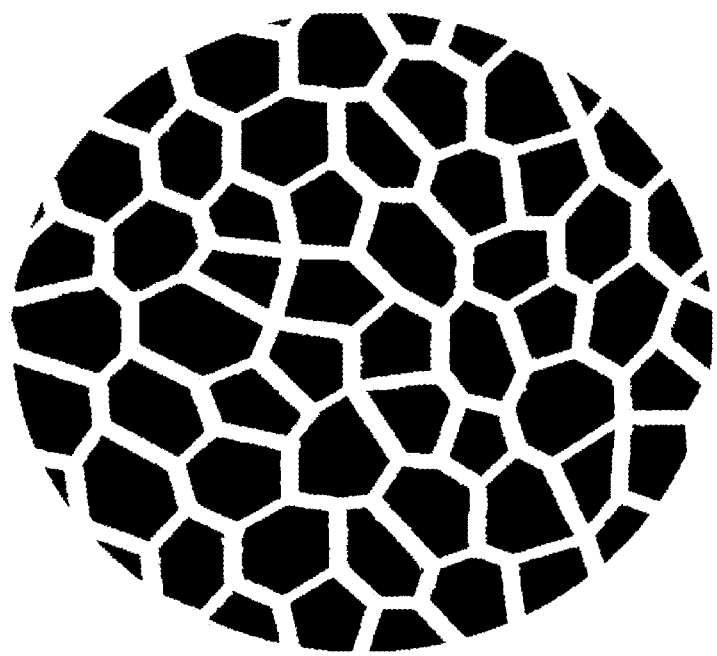
FIG. 12 is a binarized image resulting from binarization of an image obtained by photographing the region (Dc) surrounded by a circle having a diameter of 8 mm that is arbitrarily selected on the exposed surface (α) of the resin layer of the pressure sensitive adhesive sheet produced in Comparative Example 3, from the side of the surface (α) with a digital microscope. Black parts of the binarized image are corresponding to a flat face, and white parts thereof are corresponding to the concave portion.
Figure 13:
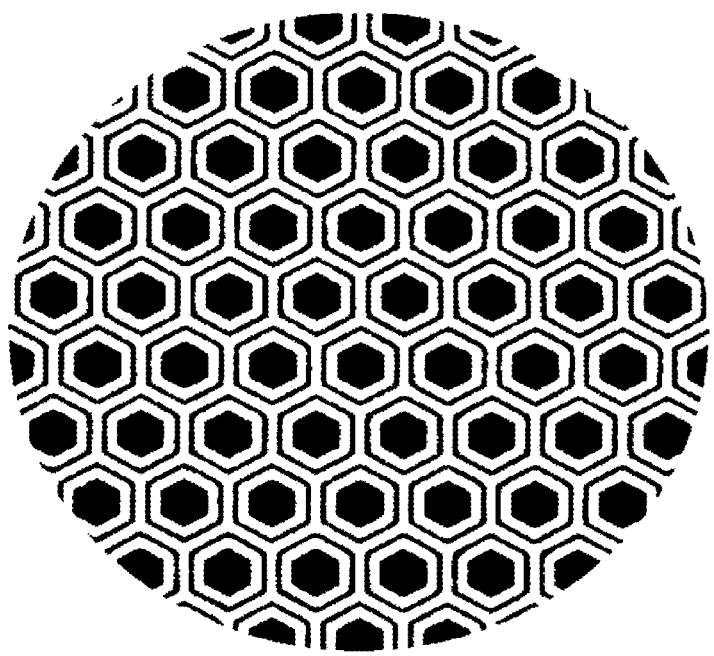
FIG. 13 is a binarized image resulting from binarization of an image obtained by photographing the region (Dc) surrounded by a circle having a diameter of 8 mm that is arbitrarily selected on the exposed surface (α) of the resin layer of the pressure sensitive adhesive sheet produced in Comparative Example 4, from the side of the surface (α) with a digital microscope. Black parts of the binarized image are corresponding to a flat face, and white parts thereof are corresponding to the concave portion.

FIG. 6(b) is a cross section image acquired by observing a cross section of the pressure sensitive adhesive sheet produced in Example 1 with a scanning microscope. The

TABLE 4

| Evaluation content | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Whether or not concave portion and flat face can be confirmed through visual inspection | | | A | A | A | A | A | A | A | A |
| Evaluation regarding shape, etc. of concave portion & flat face existing in region (Dc) | Concave portion & flat face | Item (a) | A | A | A | A | B | B | B | B |
| | Flat face | Item (b1) | A+ | A+ | A+ | A+ | A+ | A+ | A+ | A+ |
| | | Item (b2) | A | A | A | A | F | F | A | F |
| | | Item (b3) | A | A | A | A | F | F | A | F |
| | Concave portion | Item (c1) | A | A | A | A | C | C | C | C |
| | | Item (c2) | A | A | A | A | F | F | A | F |
| | | Item (c3) | A | A | A | A | F | F | A | F |
| Occupying area ration of flat face (%) | | | 67.2 | 55.4 | 52.7 | 59.6 | 77.6 | 82.9 | 67.4 | 48.7 |
| Occupying area ratio of concave portion (%) | | | 32.8 | 44.6 | 47.3 | 40.4 | 22.4 | 17.1 | 32.6 | 51.3 |
| Evaluation regarding areas of flat face and concave portion existing in region (Dc) | Flat face | item (d1) | A+ | A+ | A+ | A+ | A+ | A+ | A+ | A+ |
| | | item (d2) | A+ | A+ | A+ | A+ | C | C | C | C |
| | Concave portion | item (e1) [%] | 83.7 | 99.1 | 99.1 | 95.3 | 100.0 | 7.3 | 100.0 | 41.5 |
| | | item (e2) | A+ | A+ | A+ | A+ | C | C | C | C |
| Measured value regarding flat faces (S) | $r_{MAX}$ value of flat faces (S) | | 0.345 | 0.484 | 0.552 | 0.417 | 0.962 | 0.942 | 0.700 | 0.648 |
| | Skewness Sk value | | 2.6 | 2.1 | 1.5 | 1.4 | 0.5 | 0.1 | 0.3 | −0.7 |
| | Kurtosis Ku value | | 7.0 | 5.2 | 2.2 | 2.2 | 0.0 | −1.4 | −0.8 | −1.5 |
| Whether or not concave portion having maximum height difference of 0.5 µm or more exists in region (Dc) | | | A | A | A | A | A | A | A | A |
| Mass retention rate (%) of resin layer of pressure sensitive adhesive sheet | | | 9.8 | 10.5 | 11.0 | 10.6 | 0.0 | 0.0 | 0.0 | 0.0 |
| Evaluation of characteristics of pressure sensitive adhesive sheet | Air escape property | | 4 | 5 | 5 | 5 | 2 | 1 | 2 | 2 |
| | Pressure sensitive adhesive strength (N/25 mm) | | 16.5 | 13.7 | 13.5 | 14.5 | 16.9 | 17.5 | 15.7 | 9.5 |
| | Blister resistance | | B | A | A | A | C | C | B | B |

In the pressure sensitive adhesive sheets of Examples 1 to 4, there were brought the results such that all of the $r_{MAX}$ values of the flat faces (S) is 0.60 or less, and in attaching the pressure sensitive adhesive sheet to the adherend, even in the case where a pressure is applied to any direction, excellent air escape property and pressure sensitive adhesion characteristics may be revealed with a well balance.

On the other hand, in the pressure sensitive adhesive sheets of Comparative Examples 1 to 4, there were brought the results such that in attaching the pressure sensitive adhesive sheet to the adherend, in the case where a pressure is applied to a specified direction, the air escape property is inferior.

FIG. 6(a) and FIGS. 7 to 13 are each a binarized image resulting from binarization of an image obtained by photographing the region (Dc) surrounded by a circle having a diameter of 8 mm that is arbitrarily selected on the exposed surface (α) of the resin layer of the pressure sensitive adhesive sheet produced in each of Examples 1 to 4 and Comparative Examples 1 to 4, from the side of the surface (α) with a digital microscope.

cross sections of the pressure sensitive adhesive sheets of Examples 2 to 4 are analogous to the cross section image of FIG. 5.

INDUSTRIAL APPLICABILITY

One embodiment of the pressure sensitive adhesive sheet of the present invention is useful as a pressure sensitive adhesive sheet having a large adhesive area that is used for identification or decoration, for masking in coating, and for surface protection for metal plates, etc.

REFERENCE SIGNS LIST 1a, 1b, 2a, 2b: Pressure sensitive adhesive sheet
11: Substrate
12: Resin Layer
12a: Surface (α)
12b: Surface (β)
(X): Resin part (X)
(Y): Particle Part (Y)

(Xβ): Layer (Xβ) mainly containing the resin part (X)
(Xα): Layer (Xα) mainly containing the resin part (X)
(Y1): Layer (Y1) containing the particle part (Y) in an amount of 15% by mass or more
13, 13a, 131, 132: Concave portion
14, 14': Flat face
14a, 14b, 14c, 14d, 14e, 14f, 14g: Flat face (S)
15a, 15b, 15c, 15d, 15e, 15f, 15g: Circumscribed rectangle
21, 22: Release material
50: Circle having a diameter of 8 mm
100: Translucent adherend
100a: Smooth face
101: Adherend

The invention claimed is:

1. A pressure sensitive adhesive sheet, comprising:
a substrate or a release material; and
a resin layer provided on the substrate or the release material and comprising a resin part (X) comprising a resin as a main component and a particle part (Y) consisting of fine particles having a mean particle size of 0.01 to 100 μm,
wherein the fine particles comprise at least one selected from the group consisting of silica particles comprising 85 to 100% by mass of silica, metal oxide particles, and smectite particles,
at least a surface (α) of the resin layer on the side opposite to the side on which the substrate or the release material is provided has pressure sensitive adhesiveness,
a concave portion and a plurality of flat faces having an irregular shape exist in a region (Dc) surrounded by a circle having a diameter of 8 mm that is arbitrarily selected on the surface (α) of the resin layer,
the plurality of flat faces comprises a flat face (f1) having an area within which a region surrounded by a circle having a diameter of at least 100 μm is selectable, and
with respect to at least one flat face (S) in the plurality of flat faces excluding flat faces having a cumulative relative frequency of 30% or less determined by adding relative frequency from the respective flat faces with a smaller area, when the region (Dc) containing one or more of the flat faces (S) is placed on an orthogonal coordinate system such that a direction orthogonal to the horizontal Feret's diameter direction is the vertical Feret's diameter direction, an $r_{MAX}$ value of the one or more of the flat faces (S) calculated from the following Operations (i) to (iii) is 0.60 or less:
Operation (i): with respect to all of the one or more of the flat faces (S) contained in the region (Dc), a ratio of an area of the flat face (S) to an area of a circumscribed rectangle of flat face (S) which circumscribes the flat face (S) by two pairs of straight lines parallel to the horizontal Feret's axis and the vertical Feret's axis [{area of flat face (S)}/{area of circumscribed rectangle of flat face (S)}] is calculated for every flat face (S), and r(0°) that is an average value of the obtained ratios is calculated;
Operation (ii): with respect to each of all of the one or more of the flat faces (S) in each region obtained by rotating the region (Dc) at θ, where θ=15°, 30°, 45°, 60°, 75°, or 90°, in the counterclockwise direction centering on, as a center of the rotation, the center of the circle of the region (Dc) used in the Operation (i) in the orthogonal coordinate system, a ratio of an area of the flat face (S) to an area of a circumscribed rectangle of flat face (S), which circumscribes the flat face (S) by two pairs of straight lines parallel to the horizontal Feret's axis and the vertical Feret's axis [{area of flat face (S)}/{area of circumscribed rectangle of flat face (S)}] is calculated for every flat face (S), and r(θ) that is an average value of the obtained ratios is calculated with respect to every case at θ=15°, 30°, 45°, 60°, 75°, and 90°; and
Operation (iii): a maximum value of the seven values of r(θ), where θ=0°, 15°, 30°, 45°, 60°, 75°, and 90°, as calculated in the Operations (i) and (ii) is defined as the $r_{MAX}$ value of the one or more of the flat faces (S).

2. The pressure sensitive adhesive sheet according to claim 1, wherein the plurality of flat faces in the region (Dc) comprises at least one flat face (f2) having an area of 0.2 mm² or more.

3. The pressure sensitive adhesive sheet according to claim 1, wherein a skewness Sk value relative to a normal distribution curve between the area and the frequency of each of the at least one flat face (S) is 1.0 or more.

4. The pressure sensitive adhesive sheet according to claim 3, wherein a kurtosis Ku value relative to the normal distribution curve between the area and the frequency of each of the at least one flat face (S) is 1.8 or more.

5. The pressure sensitive adhesive sheet according to claim 1, wherein the concave portion has a maximum height difference of 0.5 μm or more.

6. The pressure sensitive adhesive sheet according to claim 1, wherein the concave portion is not formed by using a release material having an emboss pattern.

7. The pressure sensitive adhesive sheet according to claim 1, wherein the resin layer comprises 3 to 90% by mass of the fine particles.

8. The pressure sensitive adhesive sheet according to claim 1, wherein the resin in the resin part (X) comprises a pressure sensitive adhesive resin.

9. The pressure sensitive adhesive sheet according to claim 1, wherein the resin part (X) further comprises at least one crosslinking agent selected from the group consisting of a metal chelate crosslinking agent and an epoxy crosslinking agent.

10. The pressure sensitive adhesive sheet according to claim 1, wherein a surface (β) of the resin layer on the side on which the substrate or the release material is provided has pressure sensitive adhesiveness.

11. The pressure sensitive adhesive sheet according to claim 1, wherein the resin layer has a multilayer structure in which a layer (Xβ) mainly containing the resin part (X), a layer (Y1) containing the particle part (Y) in an amount of 15% by mass or more, and a layer (Xα) mainly containing the resin part (X) are laminated in this order from the side on which the substrate or the release material is provided.

12. The pressure sensitive adhesive sheet according to claim 11, wherein
the layer (Xβ) is formed by a composition (xβ) comprising the resin and less than 15% by mass of the fine particles,
the layer (Y1) is formed by a composition (y) comprising the fine particles in an amount of 15% by mass or more, and
the layer (Xα) is formed by a composition (xα) comprising the resin and less than 15% by mass of the fine particles.

13. A method for producing the pressure sensitive adhesive sheet according to claim 1, the method comprising:
forming a coating film (x') by a composition (x) comprising the resin and less than 15% by mass of the fine particles and a coating film (y') by a composition (y) comprising the fine particles in an amount of 15% by mass or more; and drying the coating film (x') and the coating film (y') simultaneously.

14. A method for producing the pressure sensitive adhesive sheet according to claim 1, the method comprising:

forming, on the substrate or the release material, a coating film (xβ') by a composition (xβ) comprising the resin and less than 15% by mass of the fine particles, a coating film (y') by a composition (y) comprising the fine particles in an amount of 15% by mass or more, and a coating film (xα') by a composition (xα) comprising the resin and less than 15% by mass of the fine particles, by laminating in an order of the coating film (xβ'), the coating film (y'), and the coating film (xα') from the side of the substrate or the release material; and drying the coating film (xβ'), the coating film (y'), and the coating film (xα') simultaneously.

15. A method for producing the pressure sensitive adhesive sheet according to claim 1, the method comprising:

forming, on a layer (Xβ) provided on the substrate or the release material and mainly comprising the resin part (X), a coating film (y') by a composition (y) comprising the fine particles in an amount of 15% by mass or more and a coating film (xα') by a composition (xα) comprising the resin and less than 15% by mass of the fine particles, by laminating in an order of the coating film (y') and the coating film (xα') from a side of the layer (Xβ); and drying the coating film (y') and the coating film (xα') simultaneously.

* * * * *